US005422570A

United States Patent [19]

Moreira

[11] Patent Number: 5,422,570
[45] Date of Patent: Jun. 6, 1995

[54] SPEED SENSING FOR THE THIRD HARMONIC STATOR VOLTAGE SIGNAL

[75] Inventor: Julio C. Moreira, St. Joseph, Mich.

[73] Assignee: Whirlpool Corporation, Benton Harbor, Mich.

[21] Appl. No.: 175,597

[22] Filed: Dec. 30, 1993

[51] Int. Cl.⁶ .......................... G01P 3/46; H02P 5/06; H02P 7/06; H02P 5/00
[52] U.S. Cl. .................... 324/177; 388/800; 388/806; 318/254; 318/439
[58] Field of Search ............ 324/177; 318/254, 138, 318/434, 616, 618, 439; 388/800, 806, 815, 822, 903, 928, 928.1

[56] References Cited

U.S. PATENT DOCUMENTS

| | | |
|---|---|---|
| 4,296,362 | 10/1981 | Beasley . |
| 4,481,440 | 11/1984 | Müller . |
| 4,556,827 | 12/1985 | Erdman ................. 318/254 |
| 4,585,982 | 4/1986 | Cooper et al. . |
| 4,585,983 | 4/1986 | Cooper et al. . |
| 4,622,500 | 11/1986 | Budelman, Jr. ............. 318/341 |
| 4,641,066 | 2/1987 | Nagata et al. . |
| 4,912,378 | 3/1990 | Vukosavic et al. . |
| 4,922,169 | 5/1990 | Freeman . |
| 4,959,596 | 9/1990 | MacMinn et al. . |
| 4,980,617 | 12/1990 | Tajima et al. . |
| 5,023,924 | 6/1991 | Tajima et al. . |

OTHER PUBLICATIONS

Julio C. Moreira, et al., "Simple Efficency Maximizer for an Adjustable Frequency Induction Motor Drive," IEEE Transactions on Industry Applications, vol. 27, No. 5, Sep./Oct., 1991.

Primary Examiner—Sandra L. O'Shea
Assistant Examiner—Roger Phillips
Attorney, Agent, or Firm—Hill, Steadman & Simpson

[57] ABSTRACT

A method and system for sensing the rotor speed of a brushless permanent magnet motor wherein a signal containing isolated third harmonic components of the flux density is acquired, and the absolute values of the maximas of the signal are measured, the last measured absolute maxima representing the current rotor speed of the motor.

26 Claims, 17 Drawing Sheets

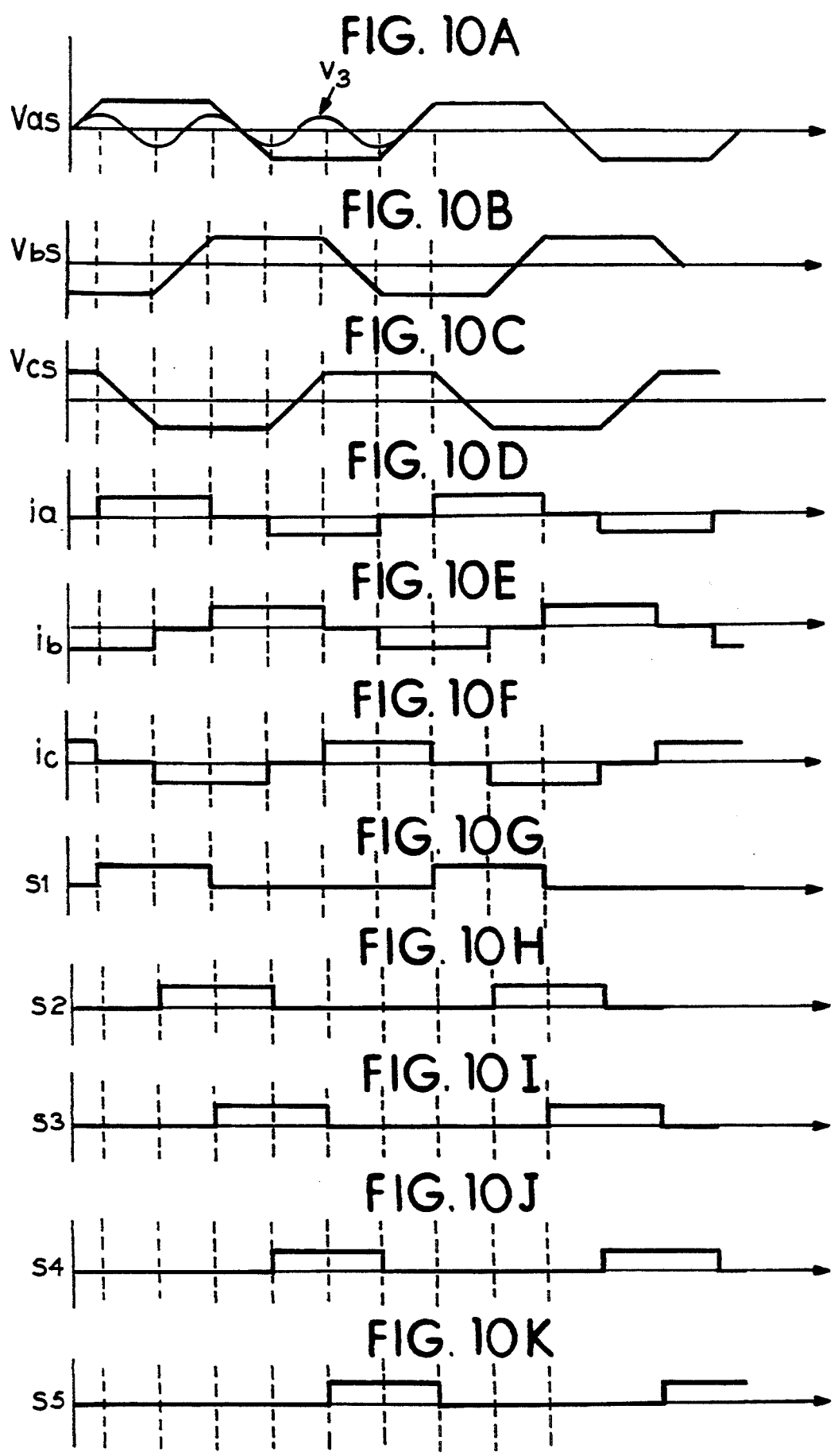

FIG. 11D
FIG. 11E
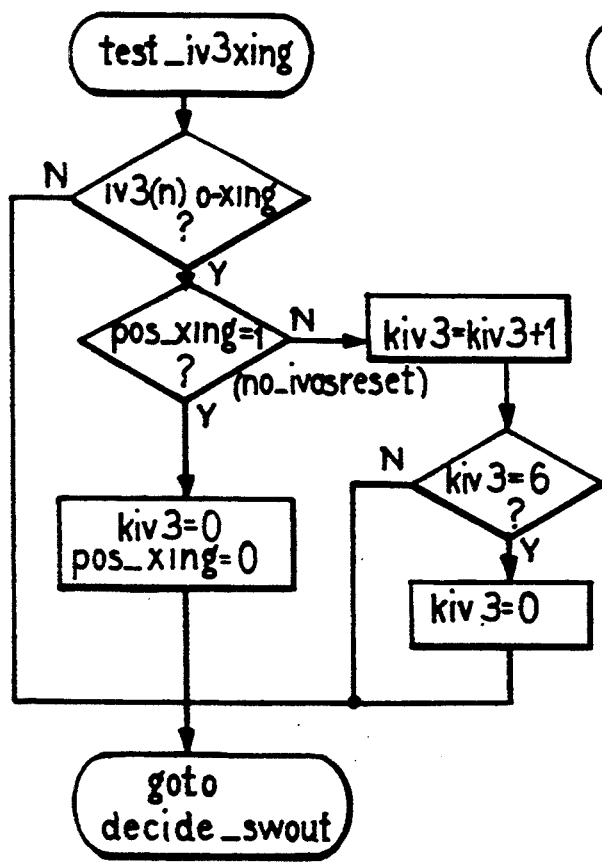
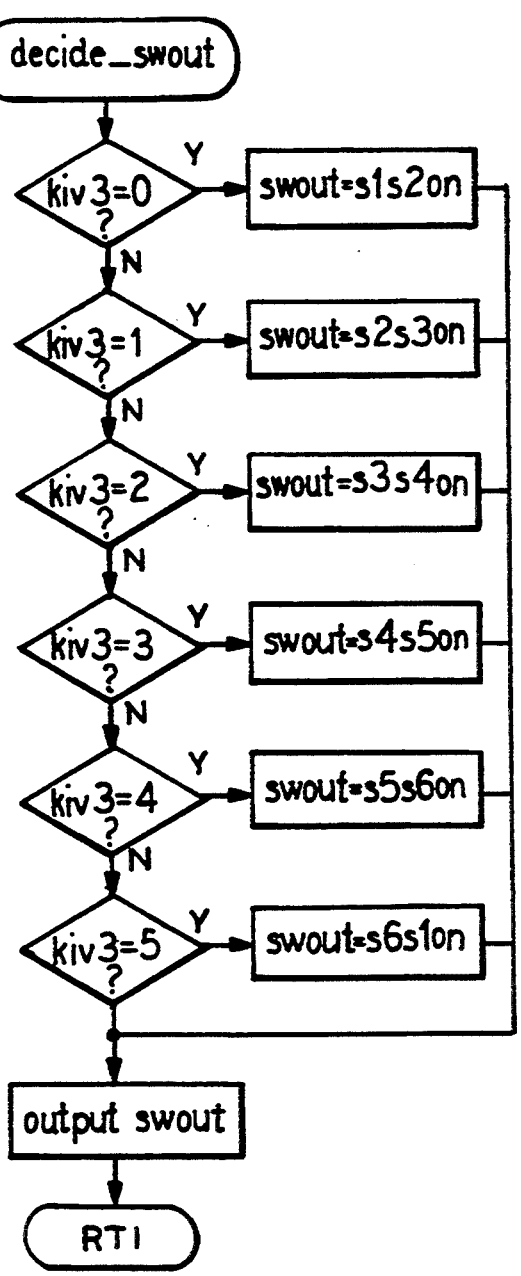

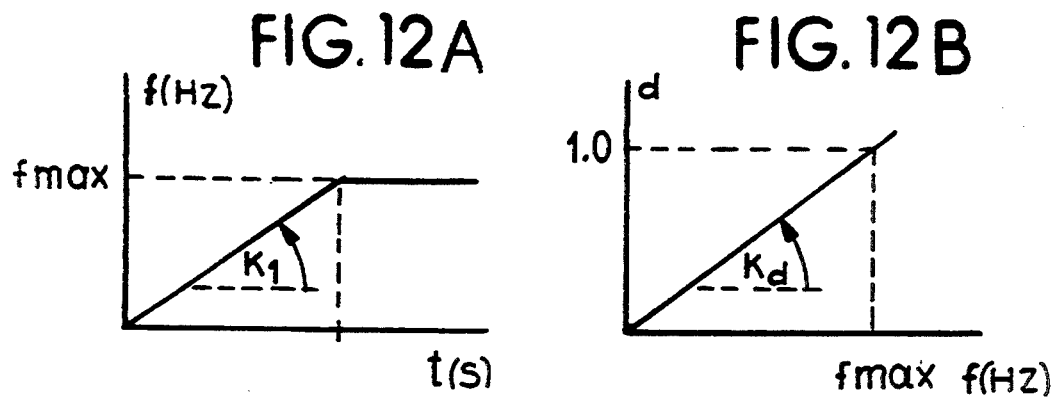
FIG. 12A
FIG. 12B
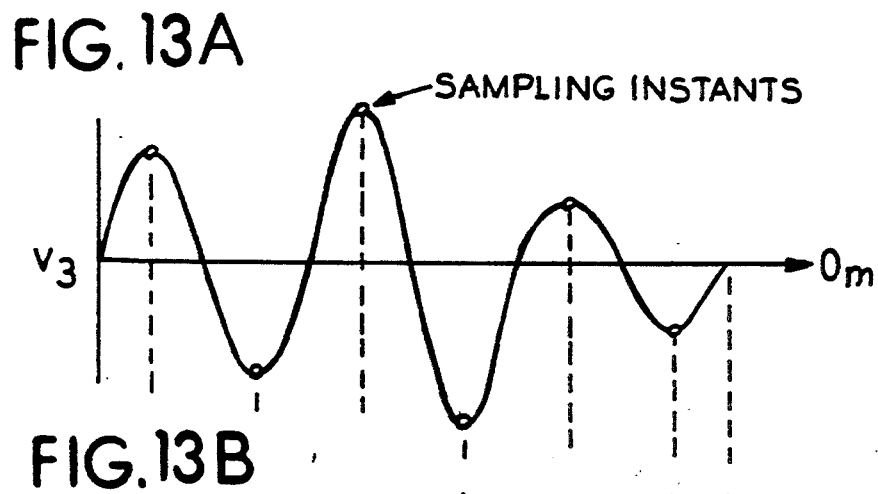
FIG. 13A
FIG. 13B
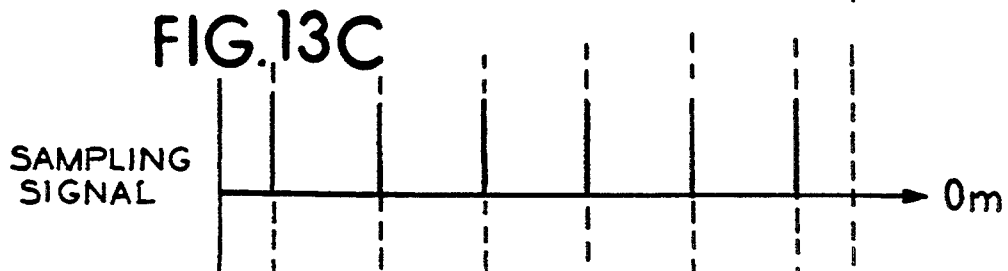
FIG. 13C
FIG. 13D
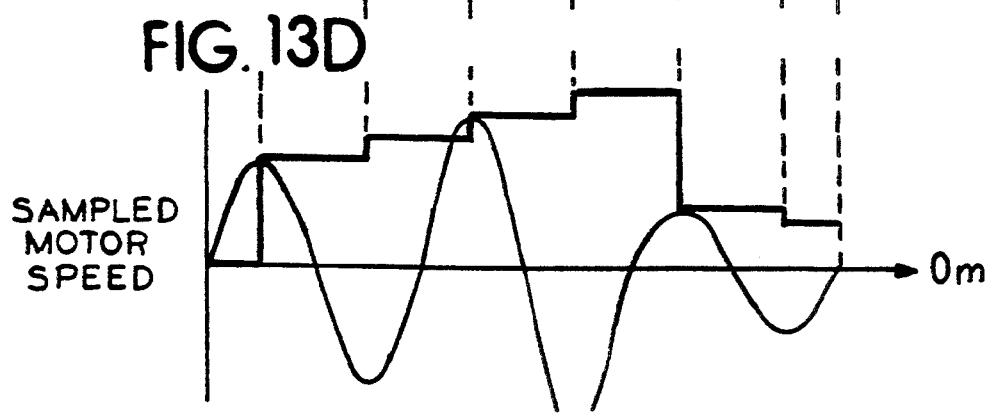

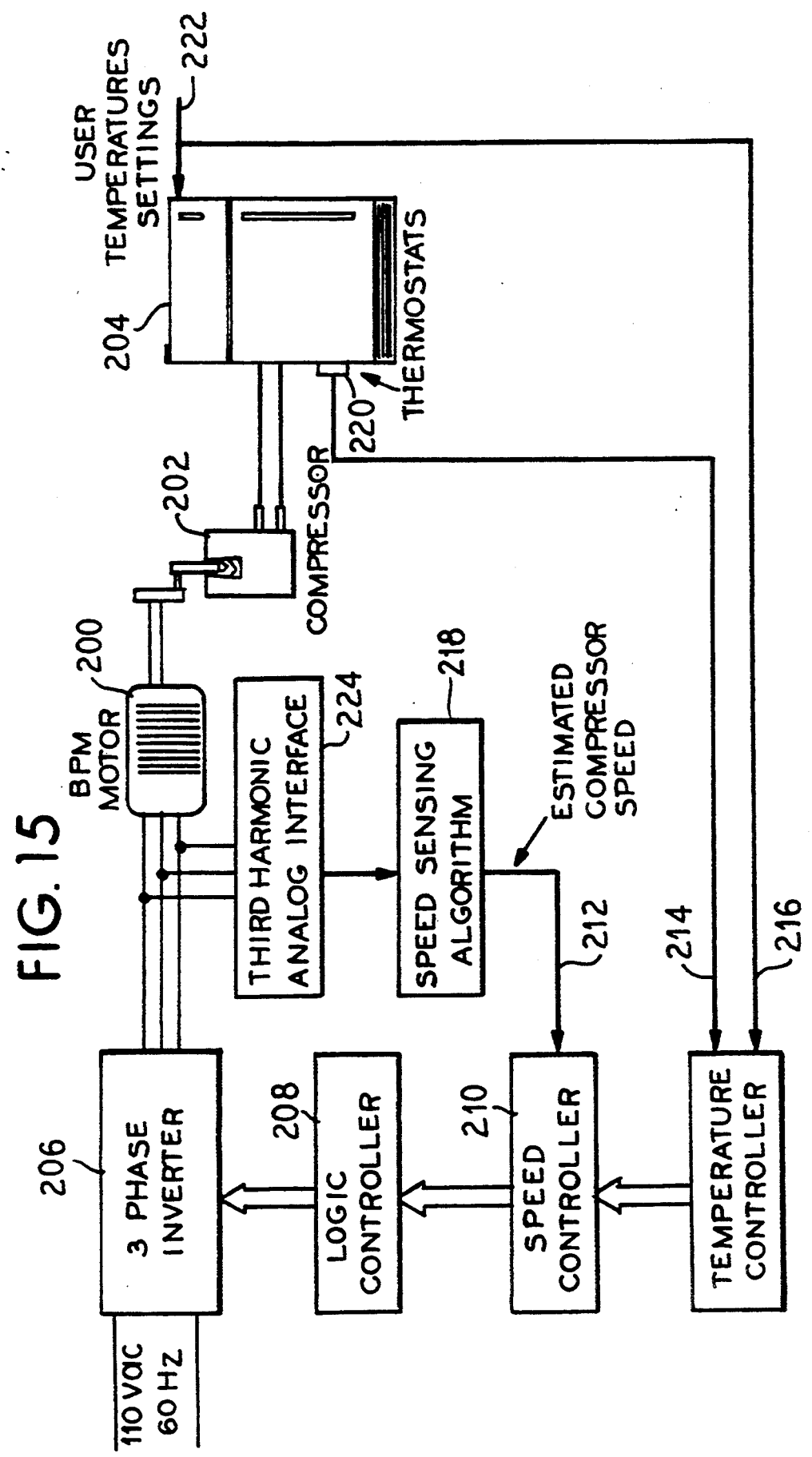

SPEED SENSING FOR THE THIRD HARMONIC STATOR VOLTAGE SIGNAL

BACKGROUND OF THE INVENTION

The present invention relates brushless permanent magnet motors. More specifically, the invention relates to interactive sensing methods and apparatus employing the third harmonic component of the stator voltage signals of such motors to control operation of such motors.

A brushless permanent magnet (BPM) motor, also referred to as a permanent magnet brushless direct current (PMBDC) motor, a permanent magnet self-synchronous motor or an electronically commutated motor, is a type of motor that comprises a multi full pitch concentrated winding stator configuration with different possibilities for the number of phases and poles, and a rotor that has permanent magnets mounted in a magnetic structure attached to the motor shaft. The magnets can be either mounted on the surface of the rotor structure (surface mounted or inset permanent magnet motor) or inside it (buried or interior permanent magnet motor). The BPM motor is driven or operated by controlled application of current signals to the stator windings.

During operation, the rotor magnets produce an air gap flux density distribution that is a function of the type of their magnetization characteristic and fabrication process. When the magnets are magnetized axially, a trapezoidal air gap flux density is produced. When this magnetization is parallel to the magnet main axis a sinusoidal air gap flux density is generated. Because the main flux is produced by magnets that do not carry currents, motor losses occur that are restricted to the copper and iron losses in the stator and to iron loss in the rotor. Hence, a BPM motor is suitable for applications where high efficiency is a concern.

Due to their high efficiency and relative control simplicity, BPM motors are becoming preferred in appliance applications such as compressors, fans, pumps, and washers. Yet, in order to operate a BPM motor adequately, information about the position of the rotor is necessary. This information is used to define stator currents which are applied by an inverter so that the flux produced by these currents is always kept in quadrature with the rotor flux. This allows a complete decoupling between rotor flux and stator current vectors, and the result is a motor that has speed and torque proportional to the voltage and current amplitude, respectively, similarly to a direct current (DC) motor.

It is possible to sense the back electromotive force (EMF) of a motor to estimate the position of the rotor. However, the back EMF signal cycles only once per revolution of the rotor producing only two zero crossings per cycle and thus is not entirely suitable for controlling stator currents that must be defined three times more often during a revolution for a three-phase motor because the rotor position can only be estimated twice per revolution. Moreover, back EMF signals can be noisy, and filters therefor can introduce delay.

The general practice is to calibrate operation of a BPM motor for efficiency at one speed. Usually this is accomplished by detecting zero crossings of the back EMF signal and then gating current application based on preselected delays, the delays accommodated efficient operation at one speed. But at other speeds, the delays are not entirely suitable. Thus, the BPM motor operates inefficiently at other speeds.

In FIG. 1 there is illustrated the idealized air gap flux density distribution in a BPM motor with magnets radially magnetized. It is illustrated that the resultant trapezoidal air gap flux density has a dominant third harmonic component that links the stator windings inducing a third harmonic voltage component in each one of the phases. Other high frequency components such as $5^{th}$, $7^{th}$ and $11^{th}$ harmonics, and a switching frequency with its side bands, are also present in the air gap flux, but they are weak relative to the third harmonic and thus the third harmonic is the dominant component.

In a three-phase system, all third harmonic voltage components are in phase, forming a zero sequence set. A third harmonic voltage component is induced in the stator phases and corresponds exactly to the air gap third harmonic component because no third harmonic currents can circulate in star connected stator windings.

It can be appreciated that a summation of the three stator phase voltages results in the elimination of all polyphase components like the fundamental and characteristic harmonics. Only the third harmonic, and other triplens together with the PWM switching frequency and its side bands will be present in the adder output signal, the third harmonic being the dominant component. The result is a signal that can be used to identify rotor position that cycles three times per rotor revolution, and this provides more accurate rotor positional information than does only a back EMF signal.

Further background information regarding BPM motors and means and methods for obtaining the third harmonic signal are described in the following United States patents, the disclosures of which are incorporated herein by reference:

4,481,440
4,959,596
4,296,362
4,585,982
4,585,983
4,641,066
5,023,924
4,980,617
4,912,378
4,922,169

U.S. Pat. Nos. 4,912,378 and 4,641,066, in particular, provide excellent background discussions.

One concern with the summation of the stator phase voltages as described above, is that access to the neutral point connection or node of the stator is necessary. For this purpose, a wire connection to the neutral node, and although easy to install in the majority of applications, it can, in some cases, represent extra cost or inconvenience to the installation.

Another problem can arise when a BPM motor is operated at high torque or high speeds if back EMF sensing is needed by the motor. At high torque or high speeds, the back EMF no longer is available due to blanking out by the commutation of the invertor.

SUMMARY OF THE INVENTION

A number of inventions are described herein.

The invention of this application provides an apparatus and method for sensing the speed of a BPM motor utilizing the third harmonic component of the stator voltages.

In an embodiment of this invention, the last measured absolute value of the third harmonic component signal is taken as the measure of the current speed of the BPM motor.

Another invention provides a system for controlling a BPM motor utilizing the third harmonic component of the stator phase voltages.

In an embodiment of this invention, a signal including the third harmonic component of the stator voltages is filtered to isolate the third harmonic component and then integrated to produce a time integral thereof. Zero crossings of the time integral signal and the back EMF for one phase are detected and the stator currents are synchronized with the motor and applied as necessary depending on these zero crossings.

Another invention provides an arrangement for obtaining the third harmonic component of the stator voltages wherein access to the stator neutral point is unnecessary.

In an embodiment of this invention, a star network of resistors is electrically coupled to the stator phase nodes of the invertor used to drive a BPM motor such that each phase has a resistor coupled between its phase node and an artificial neutral node provided separately and apart from, but in correspondence with, a stator winding neutral node, and the third harmonic component is obtained from across the artificial neutral point of the resistor network, and a reference node provided electrically between positive and negative nodes of the inverter, or the inverter ground node.

Another invention provides a method for controlling a BPM motor at high speeds.

In an embodiment of this invention, current to one phase is turned off for several cycles of the motor and zero crossings of the phase voltage are detected during this period. Thereafter, current application is resumed in synchronization with motor operation.

This invention also provides an advantage over the conventional method of measuring the internal motor voltages (or back EMF) that it is not sensitive to phase delays introduced by filters operation of a BPM motor at high speeds, when the back EMF sensing method fails.

The inventions provide means to measure the rotor flux position based on the third harmonic voltage component of the stator phase voltages and to use this signal to generate the correct stator currents that are required by the motor to operate in an electronically commutated mode.

The inventions also provide a scheme to operate a BPM motor at high speeds when the back EMF is not accessible from the stator terminal voltages.

These and other features of the inventions are discussed in greater detail below in the following detailed description of the presently preferred embodiments with reference to the accompanying drawings.

BRIEF DESCRIPTION OF THE DRAWINGS

FIGS. 11A-11E illustrate an algorithm for a computer program to control application or commutation of stator currents to a BPM motor.

FIGS. 12A and 12B illustrate time/frequency and duty cycle profiles, respectively, during implementation of the algorithm of FIGS. 11A-11E.

FIGS. 13A-13D illustrates a signal graph useful for explaining a method for sensing running speed of a BPM motor.

FIG. 15 illustrates a first application of the inventions, wherein the third harmonic stator-voltage is used to estimate motor, and compressor speeds in a refrigeration system.

DETAILED DESCRIPTION OF THE PRESENTLY PREFERRED EMBODIMENTS

As mentioned above, a BPM motor is operated by controlled application or commutation of currents to the stator windings of the motor. This task is undertaken by a switching device known as an inverter, in conjunction with a suitable controller therefor.

Figure 1:
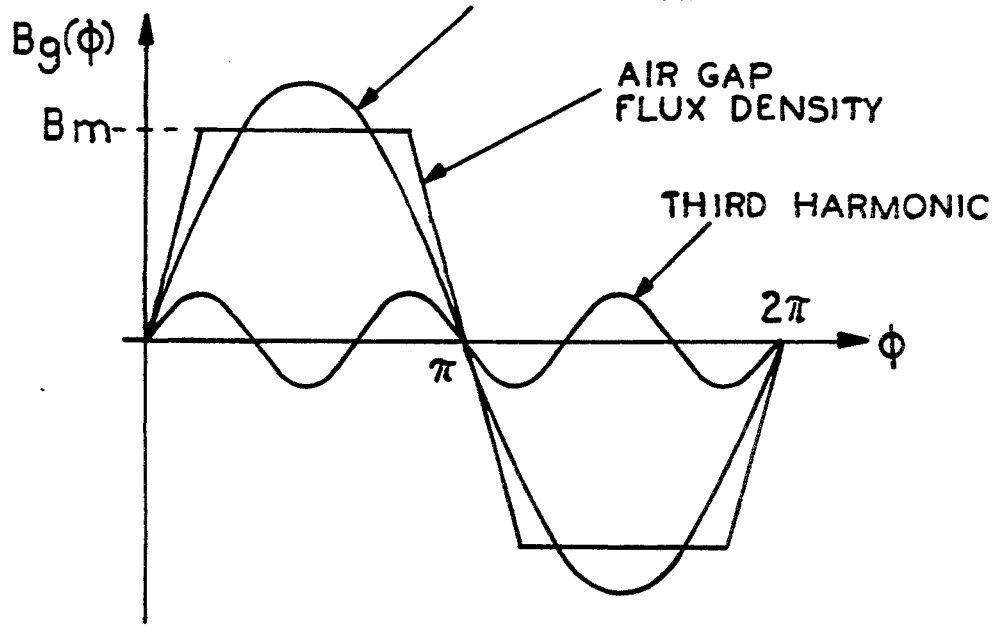
FIG. 1 illustrates a signal graph useful for explaining the idealized air gap flux density for a BPM motor in relation to the third harmonic component of the stator phase voltages.
Figure 2:
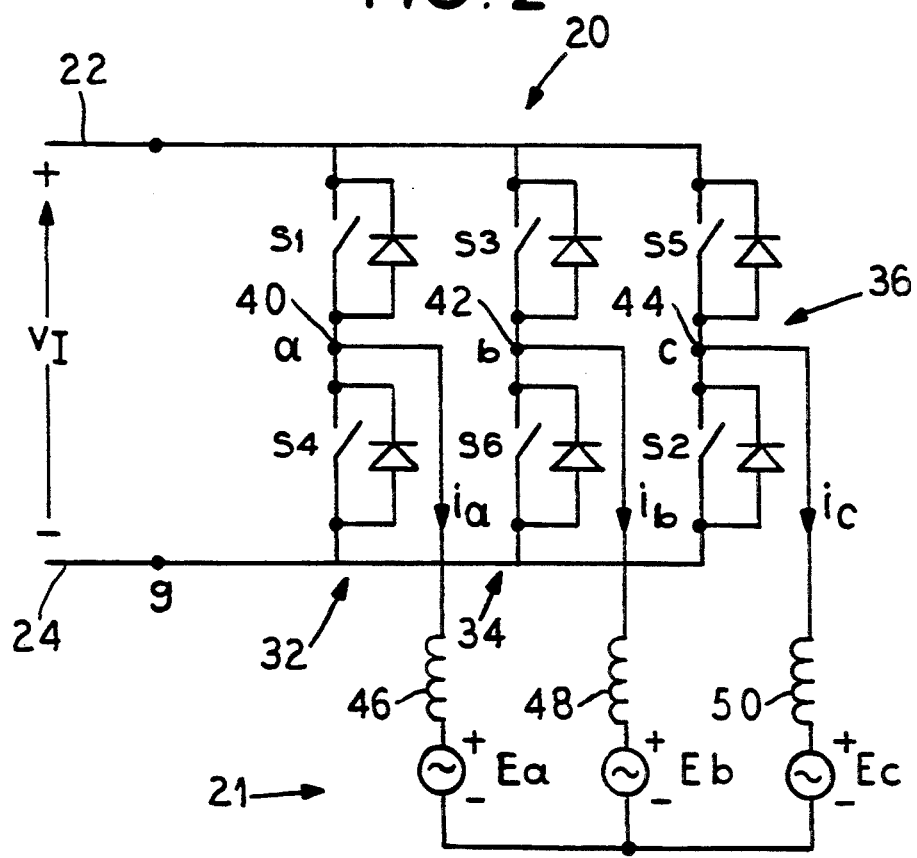
FIG. 2 illustrates an inverter arrangement useful for applying stator currents to a three-phase BPM motor.
Figure 3A:
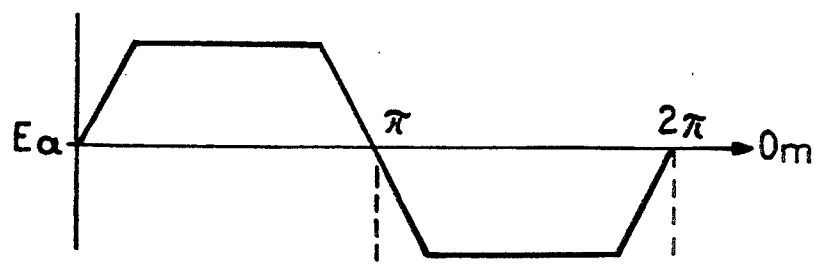
FIGS. 3A-3F illustrates a signal graph useful for explaining the relationship between the back EMF for one phase, third harmonic component of the stator phase voltages, and inverter currents for a BPM motor.
Figure 3B:
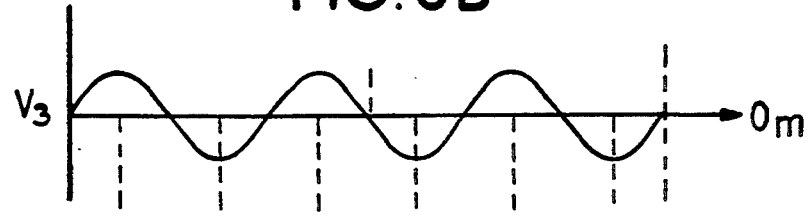
Figure 3C:
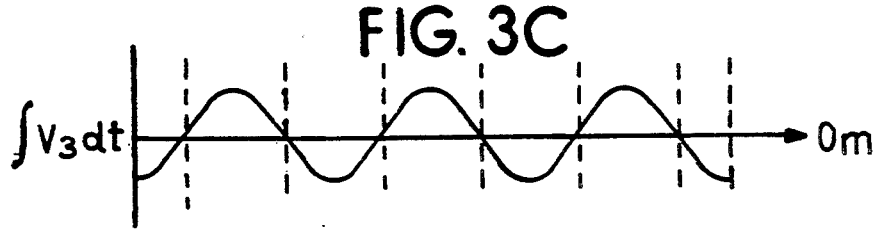
Figure 3D:
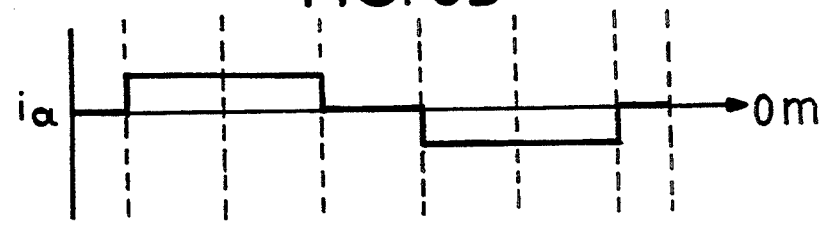
Figure 3E:
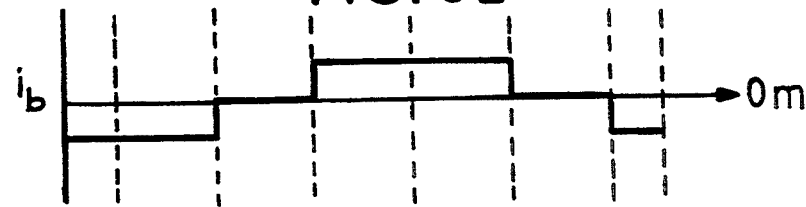
Figure 3F:
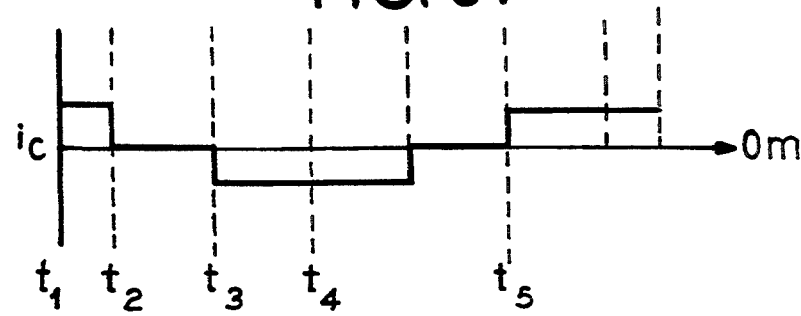

FIG. 2 illustrates an inverter 20 configured to apply various currents to a three-phase BPM motor 21. As can be seen, the inverter 20 includes a direct current signal $v_I$ input across an electrical positive rail or node 22 and an electrical negative or ground rail or node 24, also labeled g.

The invertor 20 includes three pairs of switches 32, 34 and 36 coupled across the nodes 22 and 24 to provide the square wave signal generation necessary to operate or drive the BPM motor. Each pair of switches, 32, 34 and 36 is associated with one phase of the BPM motor 21. In this example, switch pair 32 is associated with a phase a, switch pair 34 is associated with a phase b and switch pair 36 is associated with a phase c.

As illustrated, each switch pair comprises a pair of switches coupled in series across the nodes 22 and 24. Coupled across each switch in the known manner is a diode. For the purposes of this example, switch pair 32 includes switches $S_1$ and $S_4$. Switch pair 34 includes switches $S_3$ and $S_6$, and switch pair 36 includes switches $S_5$ and $S_2$. Between the switches of each switch pair is a circuit node giving rise to one of the phases a, b or c, to which the stator winding of the BPM motor are connected. Between switches $S_1$ and $S_4$ is a node 40 associated with phase a. Between switches $S_3$ and $S_6$ is a node 42 associated with phase b. Between switches $S_2$ and $S_5$ is a node 44 associated with phase c.

As mentioned above, each stator winding of the BPM motor is coupled to one of the phase nodes 40, 41 or 44. A winding 46 is coupled to node 40 of phase a, a winding 48 is coupled to node 42 of phase b, and a winding 50 is coupled to node 44 of phase c.

As can be appreciated, a back EMF voltage develops across each of windings 46, 48 and 50 during operation of the BPM motor. These back EMF voltages are represented in FIG. 2 by the references $E_a$, $E_b$ and $E_c$. The windings 46, 48 and 50 are connected in star configuration and have a common neutral node s.

FIGS. 3A–3F illustrates various signals relating to operation of a three-phase BPM motor with the inverter 20. FIG. 3 illustrates back EMF signal $E_a$, a third harmonic component signal $v_3$, a time integral signal $\int v_3 dt$ which is the time integral of the third harmonic component signal $v_3$, and stator winding currents $i_a$, $i_b$ and $i_c$ for the three phases a, b and c, respectively.

It can be appreciated from FIGS. 3A–3F that a transition in the currents $i_a$, $i_b$ and $i_c$ exists each time the third harmonic component signal $v_3$ reaches a maximum and, consequently, each time the time integral signal $\int v_3 dt$ crosses zero. Yet detection of the positive zero crossings of the back EMF voltage for one phase is necessary in order to implement a control algorithm that can command application of the illustrated stator currents $i_a$, $i_b$ and $i_c$.

As described in greater detail below, a control algorithm can be implemented that employs the signal information set forth in FIGS. 3A–3F to define the correct stator currents $i_a$, $i_b$ and $i_c$. In this regard, an algorithm can be implemented that upon detection of a zero crossing of the back EMF signal $E_a$ (for example, at time $t_1$) waits for the next zero crossing of the time integral signal $\int v_3 dt$ (in this example at time $t_2$) in order to turn the current $i_a$ on for phase a and turn off current $i_c$ in phase c. At the next zero crossing of the time integral signal (in this example at time $t_3$), the control algorithm turns off the current $i_b$ in phase b and turns on the current $i_c$ in phase c. This procedure for the turn on and turn off of the currents then would continue until one cycle is complete, i.e., at the next zero crossing of the back EMF signal $E_a$. It can be appreciated that the detection of the zero crossings of the back EMF signal $E_a$ for phase a is possible because the phase current $i_a$ at the relevant instances is zero, and consequently the terminal phase voltage at the node 40 is the signal $E_a$.

It also can be appreciated that although both the third harmonic component signal $v_3$ and its time integral $\int v_3 dt$ cycle three times during a motor revolution, and both could be used to control applications of the stator currents, it is easier to detect the zero crossings of the time integral signal $\int v_3 dt$ than to detect the maximas of the third harmonic component signal $v_3$. Therefore, the signal $\int v_3 dt$ is preferred for controlling application of stator currents.

The foregoing technique approach generally requires access to the common (neutral) node s of the stator windings 46, 48 and 50. It also requires a stator winding pole pitch different than $\frac{2}{3}$, otherwise the third harmonic flux component does not link the stator windings and the third harmonic component is not sufficiently induced in the phases. Yet, an important advantage of this technique, besides its simplicity, is its low susceptibility to noise. The result of the summation of the three phase voltages from nodes 40, 42 and 44 contains the third harmonic signal and high frequency zero sequencing components that can be eliminated by filtering. This filtering action need not necessarily introduce a significative phase change in the third harmonic signal which would be well below the filter cut off frequency, given a low pass filter. This technique also allows for operation over a wider range of frequencies than the most common technique in use today which merely detects zero crossings of the back EMF voltages.

As will be discussed in further detail below, if the detection of the zero crossing for the back EMF voltage signal $E_a$ is not available for any reason, for example, when the BPM motor operates at high torque or frequencies, an alternative control scheme can be used. In this scheme, any zero crossing of the integrated signal with a positive slope could be detected and the phase a current $i_a$ be commanded to a positive value for a complete cycle of the time integral signal $\int v_3 dt$. At that same instant, the current $i_b$ in phase b would be commanded to a negative value and current $i_c$ in phase c commanded to turn off. Thereafter, the currents would be defined to follow the periodic six-step waveform.

As additionally will be discussed in further detail below, the speed of the BPM motor can be detected for this condition and stored for a future comparison. The control algorithm then would select another positive slope zero crossing of the time integral signal $\int v_3 dt$, but now one period of the third harmonic signal away from the first zero crossing selected. The current commands then would be defined, as before, for the first point selected and the motor speed sensed and stored. Finally, the algorithm would select the last option of a zero crossing with positive slope possible for a complete period of the back EMF signal. At this new point, the current commands would be generated and the motor speed measured as before. The three values of speed stored during this process would be compared, and if a constant load is assumed, the crossing point that allows maximum motor speed would be selected since this would be the point that the commanded currents are in phase with the back EMF signal $E_a$ (or in quadrature with the rotor flux) and the motor torque is maximum.

For instance, suppose that the positive slope crossing indicated at time $t_4$ in FIGS. 3A–3F is selected first by the control algorithm. At that instant the phase a current $i_a$ would be turned on, current $i_b$ in phase b would set to a negative value, and current $i_c$ in phase c turned off. The speed of the motor then would be measured and stored at a memory location of a microprocessor used to implement the control algorithm. The next two points in time that the controller would select are the times $t_5$ and $t_2$ indicated in the same figure. The motor speed for these three possibilities will be maximum at time $t_2$ where the torque produced by the motor is maximum. The control algorithm then would lock at that position keeping the synchronism with the time integral signal $\int v_3 dt$. This search for the proper current command would take at most three cycles to be completed, and once the correct current firing position is achieved, no need for this process to be repeated exists unless synchronism with the third harmonic signal is lost.

Figure 4:
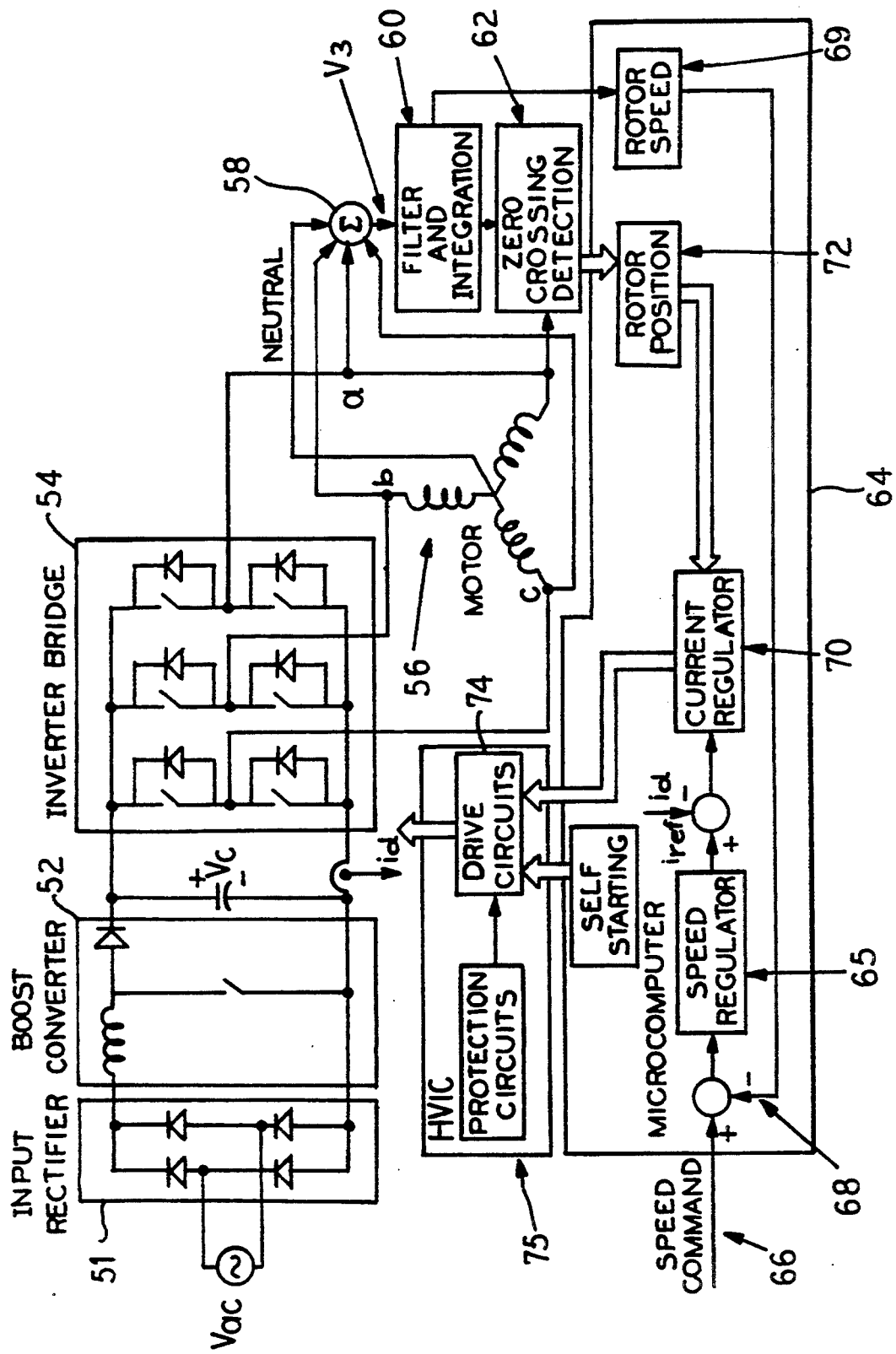
FIG. 4 illustrates an arrangement for operating a BPM motor.

FIG. 4 illustrates a BPM motor drive system in which can be implemented the method described above. In FIG. 4, alternating current $v_{ac}$ is full wave rectified by an input rectifier 51 and then filtered by an appropriate boost converter 52. The resulting DC current then is applied by an inverter bridge 54 appropriately coupled to a BPM motor 56 as described above. The BPM motor 56 is supplied by the inverter bridge 54 with current waveforms like those illustrated in FIG. 3 and described above.

As also illustrated, the motor phase voltages are summed by a summing device or unit 58 appropriately electrically coupled to each stator winding and to the stator neutral node s to generate the third harmonic component containing signal $v_3$. The resulting signal $v_3$ is basically a third harmonic voltage component that then is filtered and integrated by a low pass filter and integrator circuit or unit 60. The low pass filter removes any DC signal that could bias the integration.

The detection of the zero crossings for the time integral signal $\int v_3 dt$ and the back EMF voltage $E_a$ of phase a of the stator is performed by a zero crossing detection circuit or section 62. This information is input into a microprocessor 64 that by means of a simple rotor position generator algorithm 72 described below defines the correct rotor position reference for the applied stator currents. The speed of the motor 56 can also be obtained from the third harmonic voltage signal (as described later). Thus, a speed regulator unit 65 defines a reference value for the stator currents from a comparison of a command speed signal 66 with an actual motor speed signal 68, the latter being derived from a software rotor speed calculation routine 69 (described below). A current regulator unit or routine 70 receives information from the rotor position generator 72 and generates a pulse width modulated (PWM) signal applied to the inverter 54 via suitable drive circuits 74.

Also illustrated in FIG. 4 are protection circuits or unit 75 used to protect the drive circuits 74 from over currents and the like.

Figure 5:
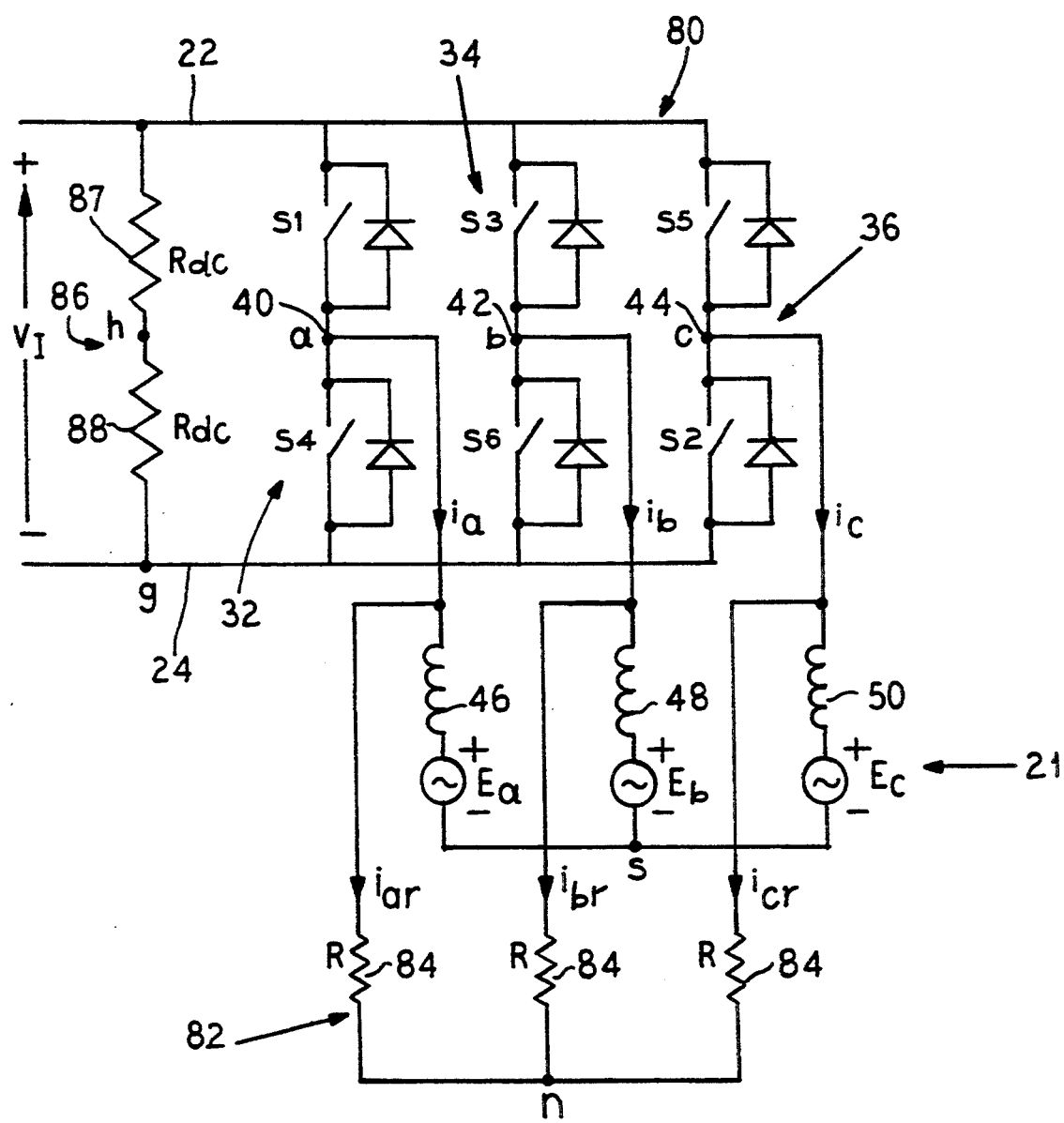
FIG. 5 illustrates another inverter arrangement that can be used to drive a three-phase BPM motor.

FIG. 5 illustrates another arrangement by which the inverter 20 can be used to drive the BPM motor 21. For the most part, the arrangement of FIG. 5 is the same as that of FIG. 2, and thus like reference alpha numeric characters are used to denote like parts. However, unlike the arrangement of FIG. 2, the arrangement of FIG. 5 includes a star network 82 of resistors 84 having the same resistance value R connected between the nodes 40, 42 and 44 and a common artificial neutral point n. Note that the neutral stator point is labeled s and the phases of the stator windings 46, 48 and 50 also are labeled a, b, and c for computational purposes. Note also that the neutral node n is provided separately and apart from, but in correspondence with, the neutral node s. The following voltage equations can then be derived:

$$v_{as} + v_{sn} + v_{na} = 0 \quad (1)$$

$$v_{bs} + v_{sn} + v_{nb} = 0 \quad (2)$$

$$v_{cs} + v_{sn} + v_{nc} = 0 \quad (3)$$

When the three equations above are added up, the result becomes:

$$(v_{as} + v_{bs} + v_{cs}) + 3v_{sn} + (v_{na} + v_{nb} + v_{nc}) = 0 \quad (4)$$

As discussed above, the summation of the stator phase voltages results in an elimination of the polyphase components, leaving the third harmonic component plus high order frequency terms so that one can write:

$$v_{as} + v_{bs} + v_{cs} = 3v_{s3} + v_{highfreq.} \quad (5)$$

where $v_{s3}$ represents the total third harmonic voltage component for a given phase and $3v_{s3}$ represents the total third harmonic component for all phases, which is 3 times the individual components for each phase since they are all in phase. The signal $3v_{s3}$ is the same as the signal $v_3$ herein.

Assuming that the resistors 84 have identical values R and because they are connected in star, the summation of the currents $i_{ar}$, $i_{br}$ and $i_{cr}$ therethrough is zero. Hence, the following equation results:

$$v_{na} + v_{nb} + v_{nc} = R(i_{ar} + i_{br} + i_{cr}) = 0 \quad (6)$$

and consequently the voltage between the artificial neutral node n and the actual stator neutral node s contains the third harmonic voltage plus the high frequency terms, $$3v_{s3} + v_{highfreq.}) + 3v_{sn} = 0 \quad (7)$$

or, $$v_{ns} = v_{s3} + \tfrac{1}{3} v_{highfreq.} \quad (8)$$

It is interesting to note that the third harmonic voltage thus can be obtained directly from the voltage across the two neutral nodes s and n and no electronic summation means is necessary to add the three-phase voltages as described above and in the U.S. patents mentioned above. Furthermore, the problem of needing to access the stator neutral node s with a fourth wire is also solved as explained next.

In that regard, recalling that the electrical negative or ground rail or node 24 of the dc bus also is labelled as g, one can write the following voltage loop equations:

$$v_{ag} + v_{gn} + v_{ns} + v_{sa} = 0 \quad (9)$$

$$v_{bg} + v_{gn} + v_{ns} + v_{sb} = 0 \quad (10)$$

$$v_{cg} + v_{gn} + v_{ns} + v_{sc} = 0 \quad (11)$$

Assuming that the motor is operating in a commutated mode, where only two switches of the inverter bridge are conducting at any time and assuming that switches $S_1$ and $S_2$ are in conduction, one has:

$$v_{ag} = v_I, \ v_{cg} = 0, \ v_{sc} = \frac{v_I}{2}, \text{ and } v_{sa} = -\frac{v_I}{2} \quad (12)$$

with $v_I$ representing the dc voltage input to the inverter bridge 80. After substituting these results in equations (9) to (11) and using the result from equation (8), one obtains:

$$v_{gn} = -v_{ns} - \frac{v_I}{2} = -v_{s3} - \tfrac{1}{3} v_{highfreq.} - \frac{v_I}{2} \quad (13)$$

This last equation shows that the voltage across the artificial neutral node n and the electrical negative or ground rail or node g of the dc bus contains the third harmonic signal and the high frequency terms added to a dc level given as $v_I/2$. The same happens for other combinations of switches in conduction, like $S_2$-$S_3$, $S_3$–$S_4$, $S_4$–$S_5$, $S_5$–$S_6$, and $S_6$–$S_1$, that correspond to a six-step inverter operation sequence. For all of these switching combinations, th voltage $v_{gn}$ is given as in equation (13).

What happens to the voltage $v_{gn}$ when a pulse width modulating (PWM) switching technique is applied to the inverter can also be considered. First, in the case of a 4-quadrant PWM, assuming that $S_1$ and $S_2$ are in conduction, the voltage $v_{gn}$ is exactly as in equation (13). When $S_1$ and $S_2$ are turned off, because of the inductive nature of the load current, the diodes across switches $S_4$ and $S_5$ go into conduction so that, $$v_{ag} = 0, \ v_{cg} = v_1, \ v_{sc} = -\frac{v_1}{2}, \text{ and } v_{sa} = \frac{v_1}{2} \quad (14)$$

and again from equations (11) and (8), $$v_{gn} = -v_{ns} - \frac{v_1}{2} = -v_{s3} - \frac{1}{3} v_{highfreq.} - \frac{v_1}{2} \quad (15)$$

This is exactly like equation (13), showing that when 4-quadrant PWM is used, the third harmonic signal is easily obtained from the voltage $v_{gn}$ by means of filtering out the dc level and the high frequency components.

When a 2-quadrant PWM is utilized, after $S_1$ and $S_2$ being in conduction, for instance, after $S_2$ is turned off and the diode across $S_5$ turns on, the equation $$v_{ag}=v_I, \ v_{cg}=v_I, \ v_{sc}=0, \text{ and } v_{sa}=0 \quad (16)$$

results from equations (11) and (8), and then the following equation is obtained, $$v_{gn} = -v_{ns} - v_I = -v_{s3} - \tfrac{1}{3} v_{highfreq.} - v_I \quad (17)$$

In this case, an ac, instead of a dc level varying from $v_I/2$ to $v_I$ at the switching frequency rate is also present in the voltage $v_{gn}$. Again, the third harmonic signal can be easily obtained by filtering $v_{gn}$ with a low pass filter only.

Another switching possibility concerns the 180 degree conduction angle for the inverter switches. This type of switching is frequently used in ac motor drives like permanent magnet/alternating current (PM/AC) motors, induction motors, synchronous motors and so on. In this case, three switches are conducting at any given time. Thus assuming that $S_1$, $S_2$, and $S_3$ are in conduction, one has, $$v_{ag}=v_I, \ v_{bg}=v_I, \ v_{cg}=0, \ v_{sc}=\tfrac{2}{3}v_I, \text{ and } v_{sa}=-\tfrac{1}{3}v_I \quad (18)$$

and the results in equations (11) and (8) yield, $$v_{gn}= -v_{ns} - \tfrac{2}{3}v_I = -v_{s3} - \tfrac{1}{3} v_{highfreq.} - \tfrac{2}{3}v_I \quad (19)$$

This last equation (19) shows that the third harmonic signal is also present in the voltage $v_{gn}$.

Also coupled across the rails or nodes 22 and 24 is a resistor network 86 comprising two series connected resistors 87 and 88 having equal values Rdc and a DC midpoint reference node h between them. As can be appreciated, the DC term, $v_I/2$ in equation (13) can be eliminated if DC reference node h between resistors 87 and 88 is employed as the reference point instead of the negative rail g of the DC bus. Hence, since $v_{hg}=v_I/2$, the following equation results:

$$v_{hn} = -v_{s3} - \tfrac{1}{3} v_{highfreq.} \quad (20)$$

During inverter commutation, for example, when a switching sequence switches from $S_1$–$S_2$ to $S_2$–$S_3$, three switches are closed, i.e., in conduction, at the same time. In this last example, switches $S_2$ and $S_3$ and the diode across switch $S_1$ would be in conduction at the same time. At that time, all inverter terminal voltages can be defined by the following:

$$v_{ag}=v_I, \ v_{bg}=v_I \text{ and } v_{cg}=0 \quad (21)$$

Utilizing these constraints in equations (9) to (11), the following results:

$$v_{gn}= -v_{s3} - \tfrac{1}{3} v_{highfreq.} - \tfrac{2}{3} v_I \quad (22)$$

and $$v_{hn} = -v_{s3} - \frac{1}{3} v_{highfreq.} - \frac{1}{6} v_1 \quad (23)$$

During a commutation in which two switches are connected to the node g, for example during the commutation sequence $S_2$–$S_3$ to $S_2$–$S_3$–$S_4$ to $S_3$–$S_4$, the voltage $v_{ng}$ becomes:

$$v_{hn} = -v_{s3} - \frac{1}{3} v_{highfreq.} + \frac{1}{6} v_1 \quad (24)$$

It can be appreciated from equations (17) and (18) that an alternating current component that varies between $-v_I/6$ and $v_I/6$ is superimposed on the third harmonic component signal $v_{s3}$. Since six commutations occur in any given period or cycle of the fundamental invertor output voltage, this superimposed component has a frequency that is three times the fundamental frequency and can be considered as a commutation notch which occurs at the same frequency as the third harmonic component signal $v_3$ when the motor is driven with a six-step waveform, i.e., no pulse width modulation. The presence of the third harmonic component in the signal $v_{hn}$ is not clear when the motor is PWM driven because a commutation notch of $\pm v_I/6$ would be generated at the PWM frequency.

In any event, the third harmonic signal $v_3$ can be obtained either from across the artificial neutral node n and the stator neutral node s or from the artificial neutral node n and the DC bus midpoint reference node h, despite the switching method used for the inverter. Although a filter is necessary to eliminate the undesired high frequency switching components and any DC signals, it is now clear that the third harmonic component signal $v_3$ can be obtained without direct access to the stator neutral node n, thus eliminating the need for a fourth wire connection to the motor.

Figure 6:
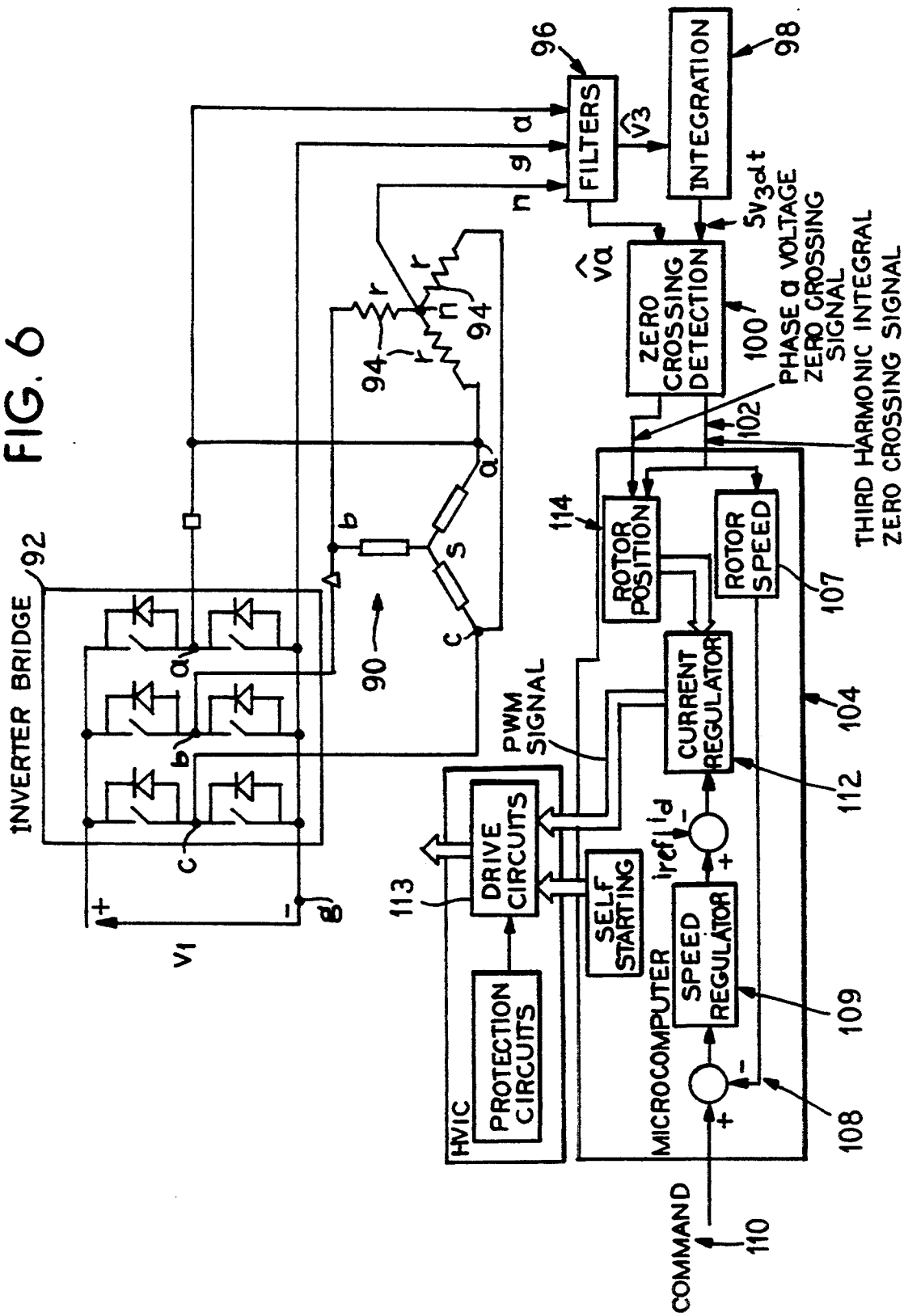
FIG. 6 illustrates an arrangement for operating a BPM motor wherein access to the stator neutral node is not needed to obtain the third harmonic component of the stator phase voltages.

FIG. 6 illustrates the main components of a BPM motor drive system for the implementation of the methods described above. In FIG. 6, a BPM motor 90 is supplied by an inverter 92 with current waveforms like those in FIGS. 3A–3F described above. Three identical star or y-connected resistors 94 are used to derive the artificial neutral node n as described above. The voltage $v_{gn}$ between the negative dc bus rail g and the artificial neutral node n contains the third harmonic signal $v_3$ as described above. The signal $v_3$ is filtered by a suitable filter circuit or section 96 to eliminate the high frequency components in the signal. If other than a 2-quadrant PWM technique is used, a DC level will be present in the voltage signal $v_{gn}$ that has to be eliminated by a low pass filter, which also would be present in the filter circuit or unit 96.

After filtering, the signal $v_3$ is integrated by integrator unit 98 to produce the time integral signal $\int v_3 dt$. The time integral $\int v_3 dt$ is input into a zero crossings detection circuit or unit 100 that detects the zero crossings for the time integral of the third harmonic signal. The terminal voltage of phase a is measured and also is filtered by a low pass filter in filter circuit or unit 96. To be sure, preferably the same filter is not used for both the third harmonic signal and the phase signal. Instead, the phase signal preferably is filtered by a separate simple anti-aliasing low pass filter. The zero crossings of the filtered phase voltage $v_a$ is also detected by the zero crossing detection circuit or unit 100.

The third harmonic integral zero crossing signal is then input into an interrupt port 102 of a microcomputer 104. Every time the third harmonic integral signal crosses zero an interrupt service subroutine can be executed and depending on the zero crossings of the output signal for the filtered phase voltage, the proper phase current turn ons and turn offs can then be commanded.

The speed of the motor 90 can also be obtained form the third harmonic voltage signal $v_3$ (as described later). For that purpose, a software implemented rotor/motor speed algorithm 107 generates an actual motor speed signal 108. A speed regulator unit 109 defines the reference value for the stator currents from a comparison of a command speed signal 110 with an actual motor speed signal 108. The speed regulator unit 109 receives information from a rotor position generator unit 111 and generates a current reference signal $i_{ref}$ which is used by a current regulator unit 112 to generate a PWM signal that in turn is applied to the inverter 92 via suitable drive circuits 113. Also input into the current regulator 112 is a rotor position signal derived from a rotor position generator unit 111 based on the zero crossings of the signals $v_a$ and $\int v_3 dt$.

Figure 7:
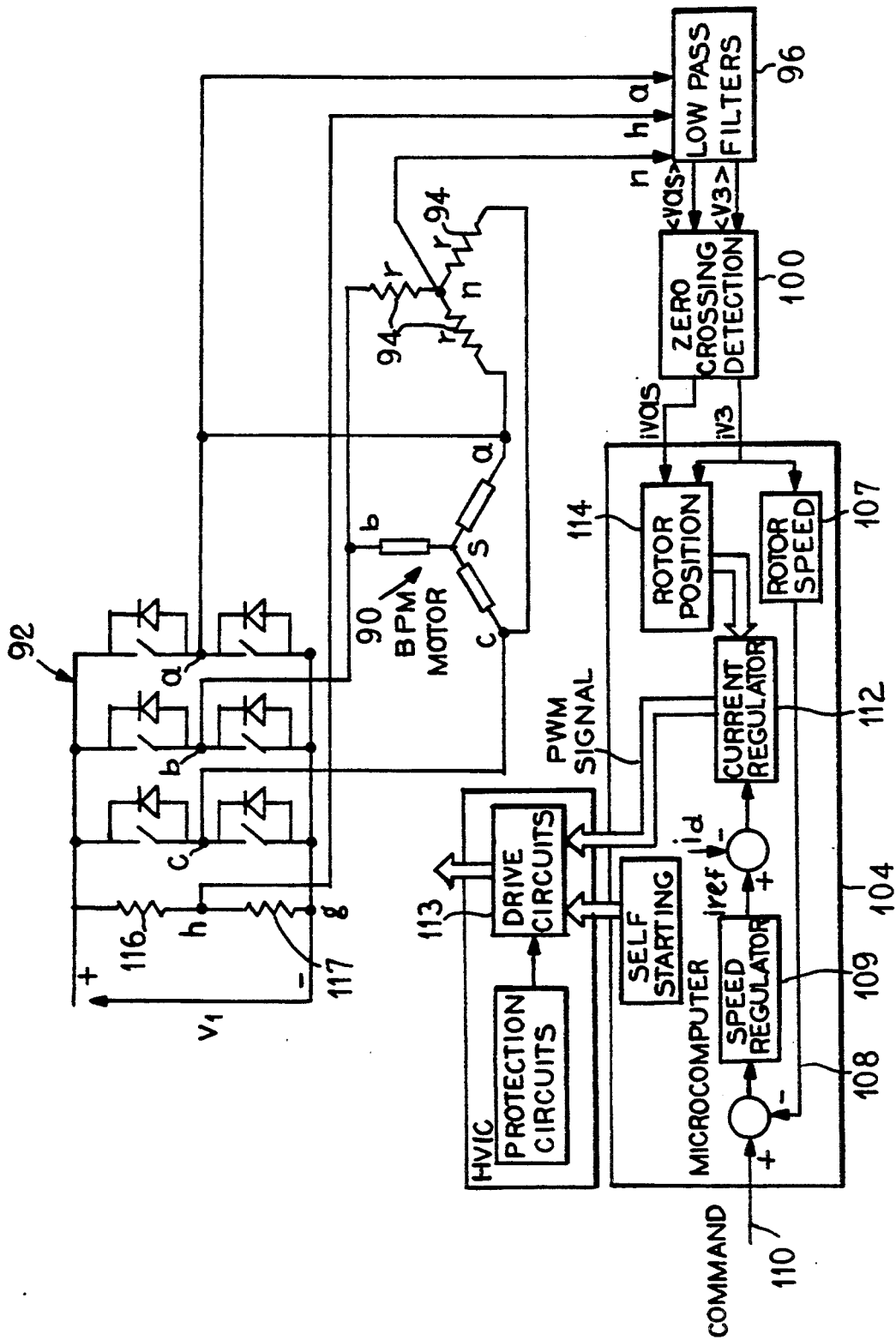
FIG. 7 illustrates another arrangement for operating a BPM motor wherein access to the stator neutral node is not needed to obtain the third harmonic component of the stator phase voltages.

FIG. 7 illustrates another BPM motor drive system that differs slightly from that of FIG. 6. In the system of FIG. 7, like components are identified with reference alphanumeric characters like those in FIG. 6.

In FIG. 7, the third harmonic signal is taken from between the DC midpoint reference node h between resistors 116 and 117, and the artificial neutral node n of the star resistor network 94. As can be appreciated, in the system of FIG. 7, no integrator is employed. Instead, the third harmonic component containing signal is filtered and then the filtered third harmonic component signal $v_3$ and phase voltage signal vas are directly input into the zero crossing detection circuit 100, as the time integral is not necessary as described above. Signals ivas and iv3, described above, then are communicated to the rotor position and rotor speed units 114 and 107, respectively. In all other respects, the systems of FIGS. 6 and 7 are alike.

Figure 8:
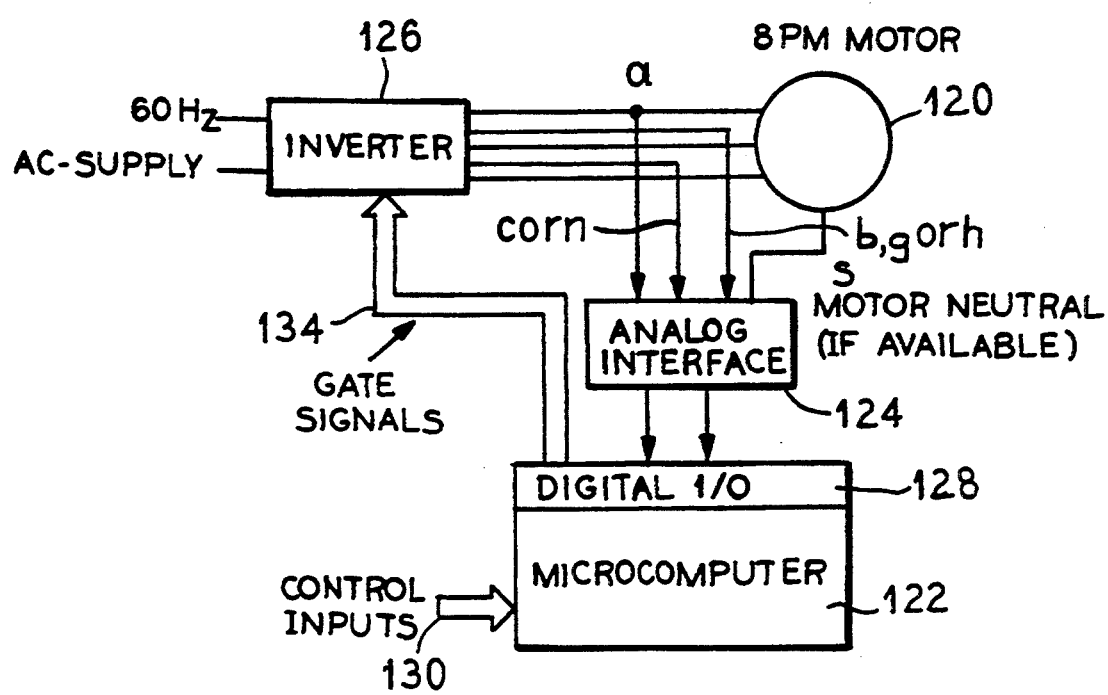
FIG. 8 illustrates a microcomputer arrangement for controlling a BPM motor.

FIG. 8 illustrates how a BPM motor 120 can be controlled with a microcomputer 122 employing either the three or four wire connection scheme described above. As illustrated, an analog interface 124 is coupled to three lines for the three phases a, b and c extending an inverter 126 and the BPM motor 120 to a digital input/output section 128 of the microcomputer 122. The interface 124 also can be coupled to the stator neutral node s, if appropriate, depending on which of the 3 or 4 wire connection schemes described above is being employed. The microcomputer 122 applies signals to the inverter 126 to drive same as is appropriate to drive the motor 120 by gating the stator winding currents as described above. As illustrated, the microcomputer 122, of course, can accept control signals 130 so that particular operation of the motor 120 can be selected.

Figure 9:
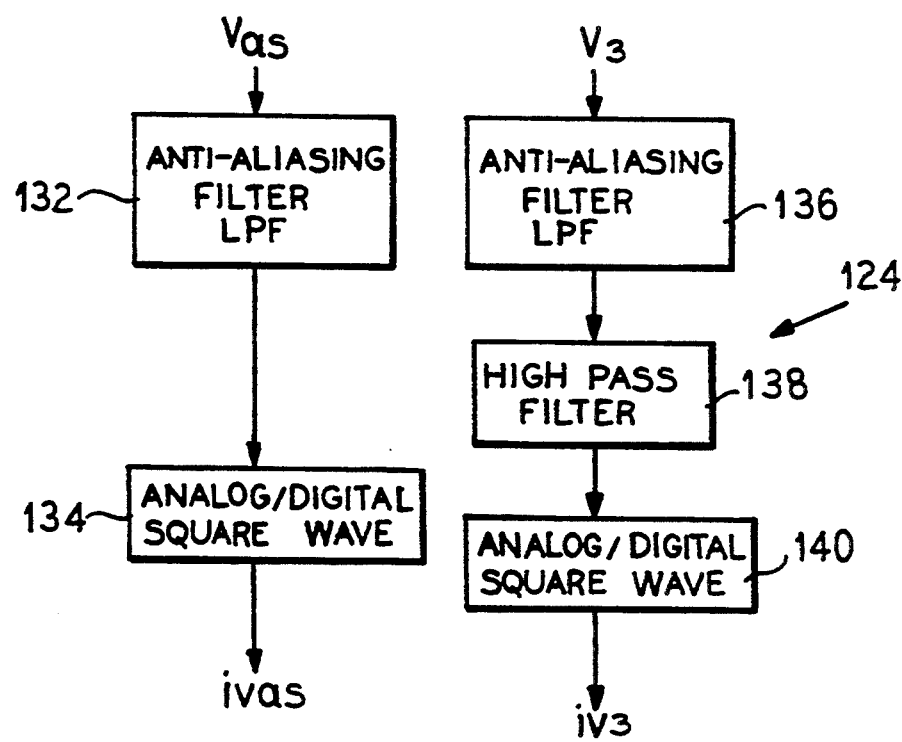
FIG. 9 illustrates in greater detail an analog interface in the arrangement of FIG. 7.

In FIG. 9, there is illustrated in greater detail a portion of the analog interface 124 of FIG. 8. As illustrated, the interface 124 accepts as inputs a third harmonic signal $v_3$ and a back EMF signal vas via parallel processing paths. The phase terminal voltage signal $v_{as}$ is first processed through an anti-aliasing low phase filter 132 and then through an analog/digital converter 134, i.e., a square wave generator. The resulting signal is a squared and filtered signal $i_{vas}$, which when the phase currents $i_a$ is off, is the same as a filtered and squared back EMF signal $E_a$.

In parallel, the third harmonic signal $v_3$ is first processed through an anti-aliasing low pass filter 136, then through a high pass filter 138, and then through an analog/digital converter or square wave generator 140, to produce a squared and filtered third harmonic signal $iv_3$. The filters 136 and 138, of course, can comprise a band pass filter.

Figure 10L:
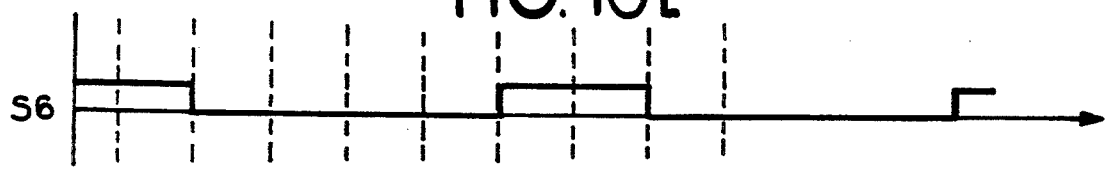
FIGS. 10A-10O illustrates a timing diagram useful for explaining operation of a BPM motor.
Figure 10M:
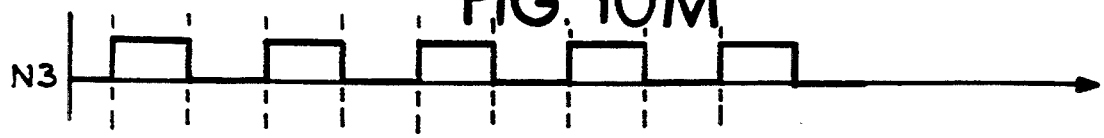
Figure 10N:
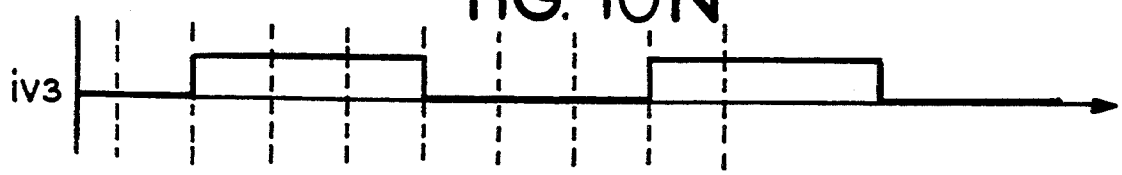
Figure 10O:
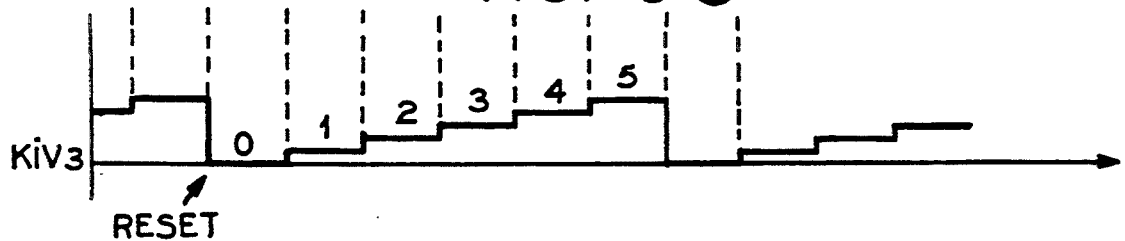
Figure 11A:
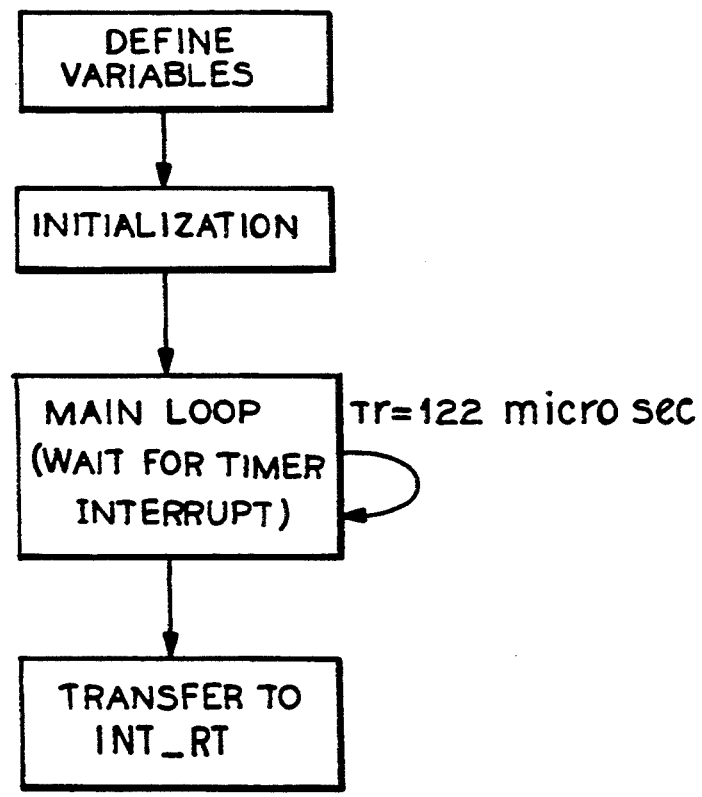
Figure 11B:
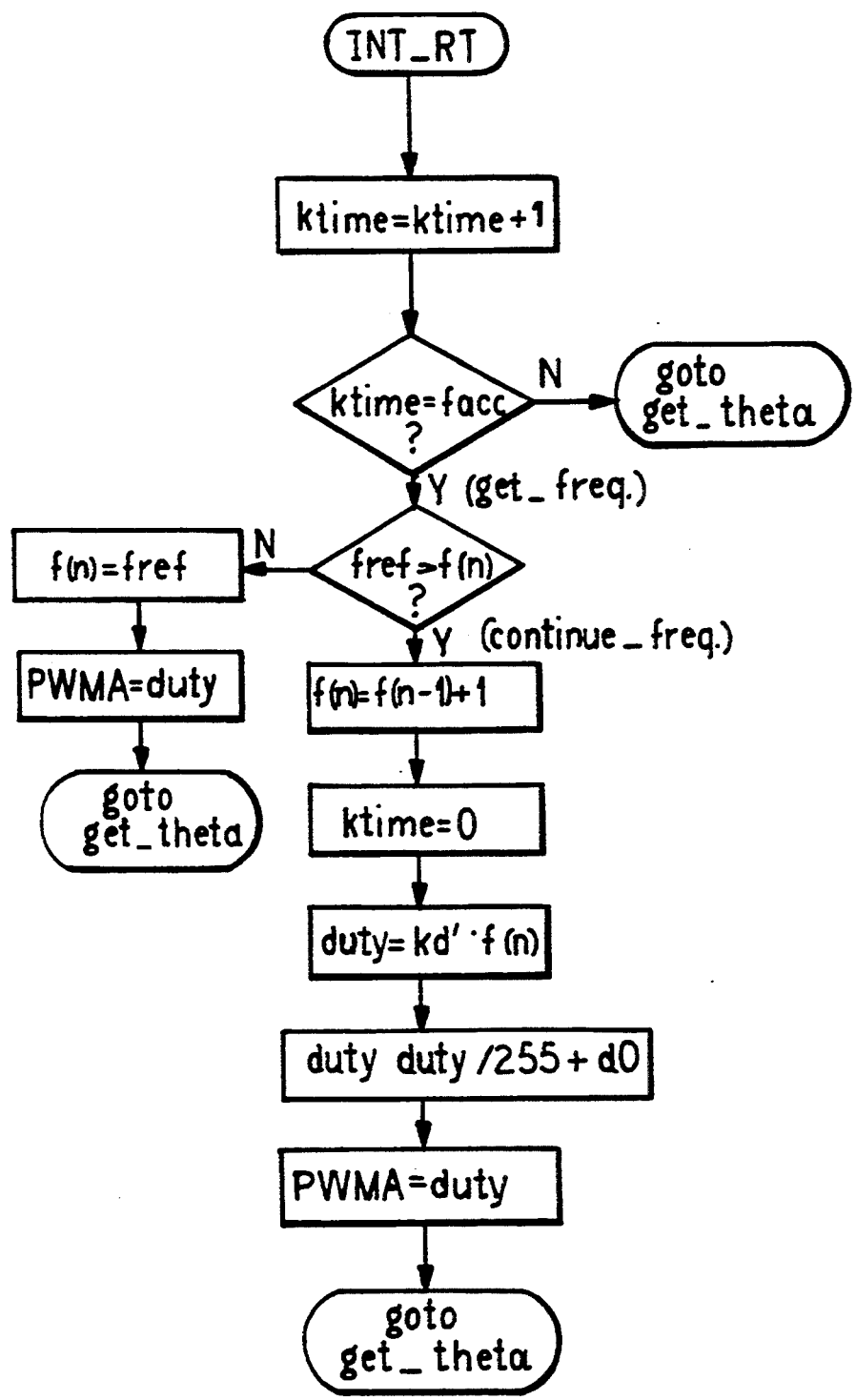
Figure 11C:
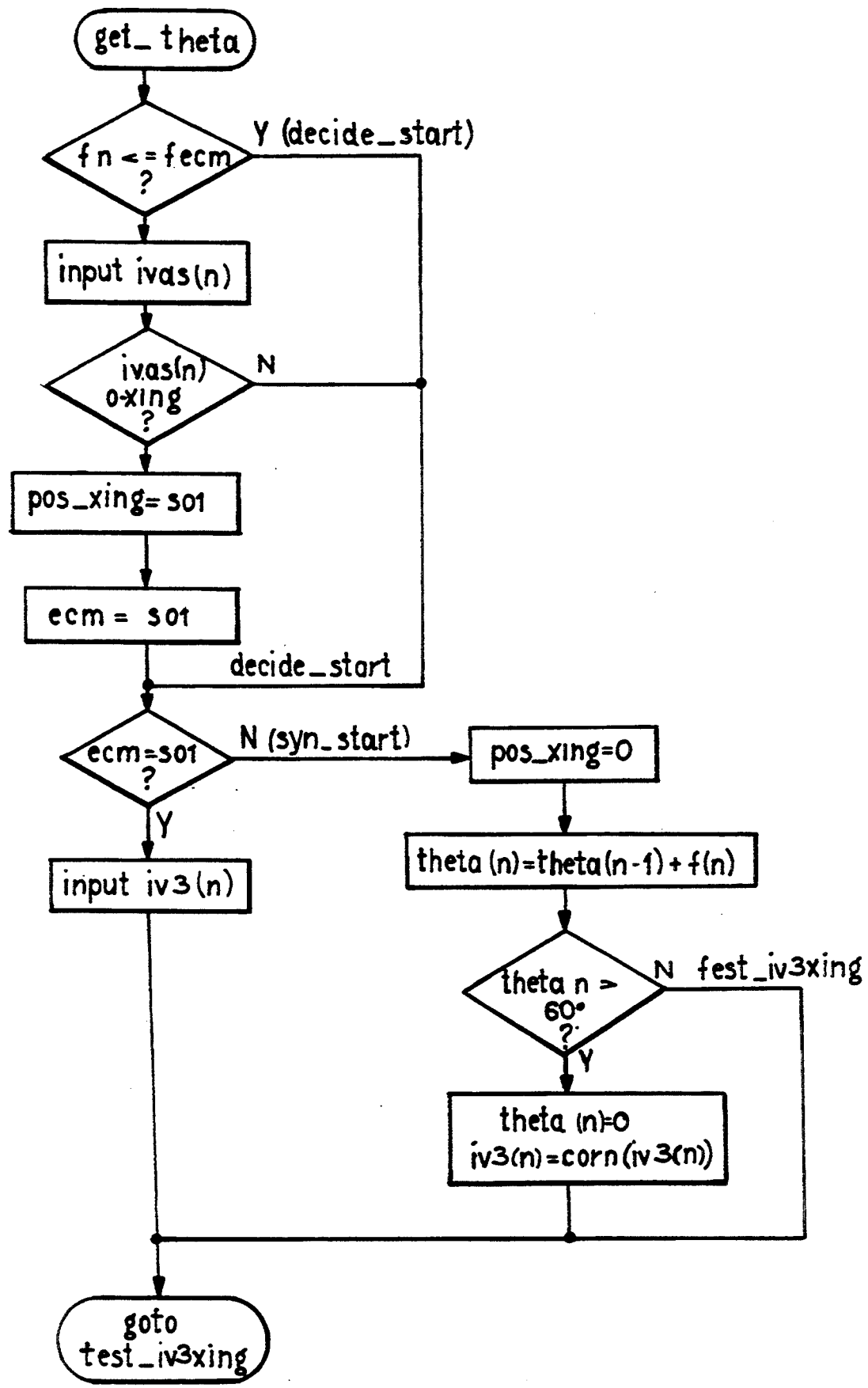

FIGS. 10A–10O show a simplified time diagram used to describe the implementation of the proposed methods via a microcomputer. FIG. 7 depicts three motor phase voltages, $v_{as}$, $v_{bs}$ and $v_{cs}$; phase currents, $i_a$, $i_b$ and $i_c$; the inverter switching signals $S_1$ to $S_6$; outputs of the analog interface circuit 124, iv3 and ivas; and a counter kiv3. The switching signals $S_1$ to $S_6$ are defined as in FIG. 2. The signal iv3 ideally is displaced 90° with respect to the third harmonic voltage signal for the entire speed range since the low pass filters 132 and 136 preferably are designed with a low cut-off frequency. Transitions on the signal iv3 correspond to maximum voltage, or rotor flux zero crossings. Therefore, the signal iv3 is actually detecting polarity changes for the third harmonic rotor flux component. The signal ivas is likewise phase delayed by 90° with respect to the phase voltage $v_{as}$. If the stator impedance voltage drop is neglected, this signal indicates the change in polarity of the fundamental component of the air gap flux, which is close to the rotor flux for a non-saturated BPM motor, as explained earlier.

The transitions or zero crossings of the signal iv3 are counted in software and the result stored in a counter variable called kiv3. The signal ivas is used to reset the software counter kiv3. The signals S1 to S6 that are applied to the respective switches or transistors of the inverter bridge are generated according to the state of the counter kiv3 as indicated in table 1.

TABLE 1

| Definition of control signal to the inverter power transistors. | | | | | | |
|---|---|---|---|---|---|---|
| kiv3 | S1 | S3 | S5 | S2 | S4 | S6 |
| 0 | on | off | off | on | off | off |
| 1 | off | on | off | on | off | off |
| 2 | off | on | off | off | on | off |
| 3 | off | off | on | off | on | off |
| 4 | off | off | on | off | off | on |
| 5 | on | off | off | off | off | on |

A flow chart for software developed to control a BPM motor in accordance with the foregoing is presented in FIGS. 11A–11E. The program executes two main functions: 1) synchronous starting, and 2) third harmonic control. A main program illustrated in FIG.

11A actually is just an infinite loop that waits for a timer interrupt to occur. All the software control is provided in an interrupt service subroutine called INT_RT illustrated in FIGS. 11B to 11E.

A BPM motor starts from rest as a synchronous motor since the rotor has to achieve a minimum speed before the third harmonic signal can be detected. It is known that BPM motors operating in synchronous mode present an unstable behavior, where current oscillations and high torque ripple can occur. Therefore, it is important to change the motor operation from synchronous to self-synchronous, or sometimes called self-commutating, as soon as possible. In this regard, the third harmonic control schemes described herein have an advantage over other methods using only the motor internal voltage (or back EMF) since it is easier to detect the third harmonic component signal at lower speeds. During tests conducted in the course of investigations of the described methods, the third harmonic component signal was acquired after approximately two revolutions after a motor was started from rest, at a speed lower than 50 RPM.

In the next paragraphs, how synchronous starting is implemented in the software illustrated in FIGS. 11A to 11E is described. Signal profiles useful for explaining such implementation are illustrated in FIGS. 12A to 12B.

During synchronous starting the applied voltage to frequency ratio constant is kept constant and, in particular, the frequency is assumed to be an independent variable. It is also assumed that a constant rotor acceleration is desired and a linear time increasing frequency profile is chosen as illustrated in FIG. 12A.

The duty cycle d of the PWM signal applied to the motor is computed from the frequency f as:

$$d = d_0 + k_d f \quad (25)$$

where $d_0$ is a base cycle value and $k_d$ is a scaling factor.

The duty cycle profile is shown in FIG. 12B. It is assumed that the maximum frequency is fmax. It is also assumed that the duty cycle is 1.0 (or 100%) for this maximum frequency value. The frequency command increases linearly with time so that the motor operates with constant acceleration. The frequency f applied to the motor is computed as $$f = k_f t \quad (26)$$

where t represents time and $k_f$ is a scaling factor. The rotor position RP then can be computed as the integral of frequency.

$$RP = \int f \, dt \quad (27)$$

In the flow chart of FIGS. 11B–11E, the generated frequency f(n) is compared to a reference value fref, which is the final frequency selected for steady state operation. The frequency value fecm is a constant that defines the frequency value above which the motor is commanded by the third harmonic signal to operate in self-commutated mode. While the frequency f(n) is below fecm, the motor operates synchronously. When in self-synchronous mode, the signal iv3 is read in and the counter kiv3 updated. The switching pattern to the power transistor is stored in the variable swout. This variable is updated according to the value of the counter kiv3.

The synchronization for the counter kiv3 comes from the detection of positive zero crossings of the signal ivas. When a zero crossing of that signal occurs, a variable pos_xing is set to 1. This variable is tested in the flow chart section test_iv3ing and when it is set the counter kiv3 is reset, and this guarantees the correct synchronism between the third harmonic and phase voltage.

If detection of the zero crossing of the signal/vas is not available for any reason, for instance when the motor operates at high speed (or high frequency), e.g., at 5000 rpm or greater for a ¼ h.p. motor, although what is considered high speed will vary depending on the application, alternative control strategies can be used in order to guarantee the correct synchronism between the third harmonic and the firing command to the inverter switches. One way to get the proper synchronism that is described herein is named "advanced turn off". The idea is to turn off one of the motor phases, phase a for instance, so that the current through that phase reaches zero when in high speed operation. The zero crossing of the phase voltage will then correspond to the zero crossing of the internal motor voltage and the control algorithm can be synchronized with a detection of change in level for the signal ivas. The controller, then, is able to detect the zero crossing (or the state change of a comparator output of which input is connected to the phase a terminal voltage) and make the decision that phase a is turned on and phase c turned off at the next zero crossing of the signal iv3. This procedure evidently would cause a torque disturbance and because of that some care would have to be taken when deciding on the frequency that this synchronisms process is utilized and the advance turn off required. If the drive system noise immunity is large, and the third harmonic signal free of commutation noise, the need for this synchronizing process may be necessary every 10000 or so rotor revolutions. In this instance, the speed disturbance due to the effects of torque variations can be greatly reduced, especially at high speeds when this scheme is applied. It can be appreciated that the number and length of interrupts will vary depending on the application.

FIG. 13 illustrates a timing chart useful for explaining how the operating speed of a BPM motor can be sensed or identified. In FIGS. 13A–13D, the timing relationship between the third harmonic component signal $v_3$, the time integral of that signal $\int v_3 dt$, a sampling signal, and a sampled motor speed signal is illustrated. As can be seen, the sampling signal is triggered by detection of zero crossings of the time integral signal $\int v_3 dt$. Thus, these samples of the motor speed can easily be taken during one cycle of the motor.

As illustrated in FIG. 13, the third harmonic component signal $v_3$ is sampled at the rate dictated by the sampling signal. The absolute value of the signal $v_3$ directly correlates with the motor speed. Thus, the sampled motor speed signal is a DC signal whose value at any given instant is directly proportional to the last sampled absolute value of the signal $v_3$.

Figure 14A:
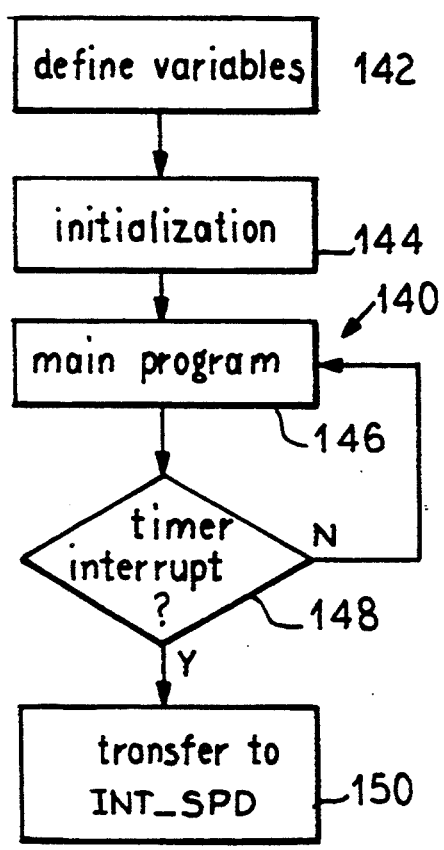
FIGS. 14A and 14B illustrates a flow chart of an algorithm for a computer program for determining the speed of a BPM motor.
Figure 14B:
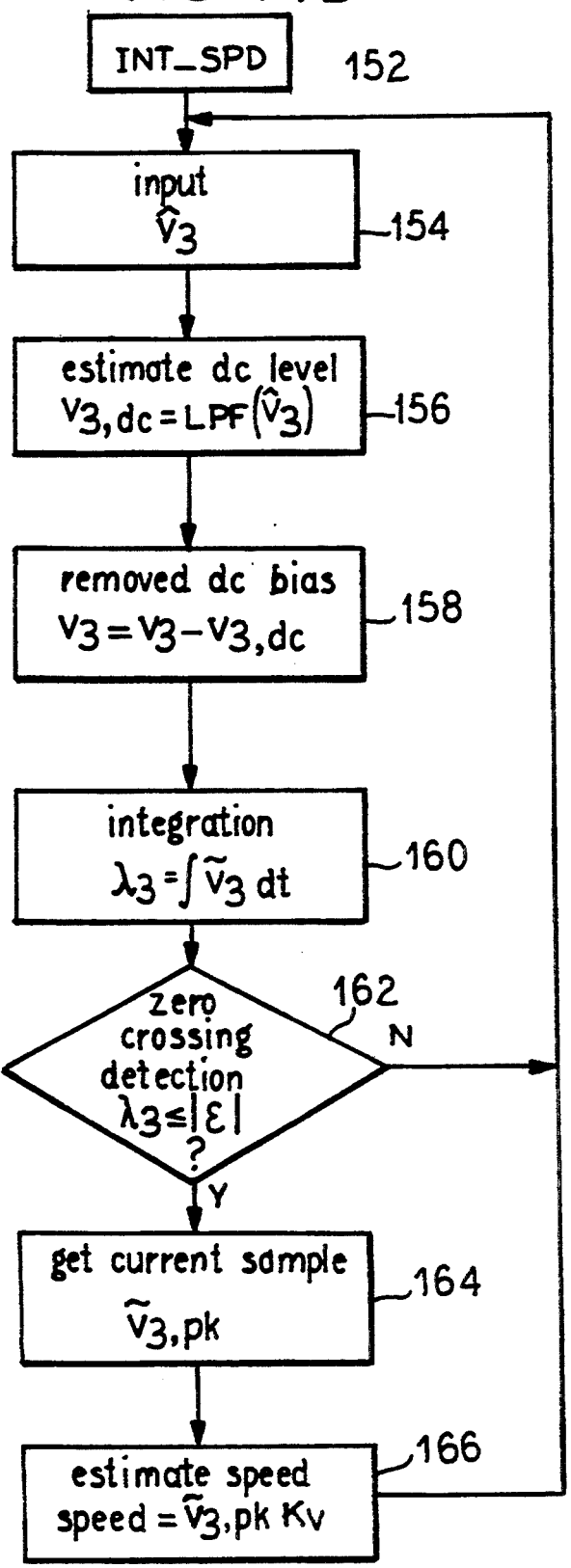

In FIGS. 14A and 14B there is illustrated in a flow chart, an algorithm for effecting on a microcomputer the motor speed sensing just described. As illustrated in FIG. 14A, a main program normally runs on the microcomputer such as that illustrated in FIG. 11A. Then, preferably, upon detection of a zero crossing of the time integral signal, a program interrupt is caused to occur which calls into operation a motor speed sensing algorithm INT_SPD, illustrated in FIG. 14B.

As illustrated in FIG. 14B, the interrupt program, the instantaneous amplitude of the signal $v_3$ first is sensed in step 154. Then the DC level of the signal $v_3$ is estimated after low pass filtering in sep 156. Then any DC bias is eliminated in step 158. Then the filtered third harmonic component signal $v_3$ is integrated in step 160. Then zero crossings of the time integral signal $\int v_3 dt$ are detected in step 162. If no zero crossing has occurred, then the interrupt program INT_SPD recommences at step 154. Otherwise, the peak amplitude of the signal $v_3$ is obtained in step 164.

Finally, in step 166, the absolute value of the sensed peak value of the third harmonic compound signal $v_3$ is taken and converted into a positive DC signal by adjusting the signal by a known factor to produce the sampled motor speed signal described above in connection with FIG. 13.

Figure 16:
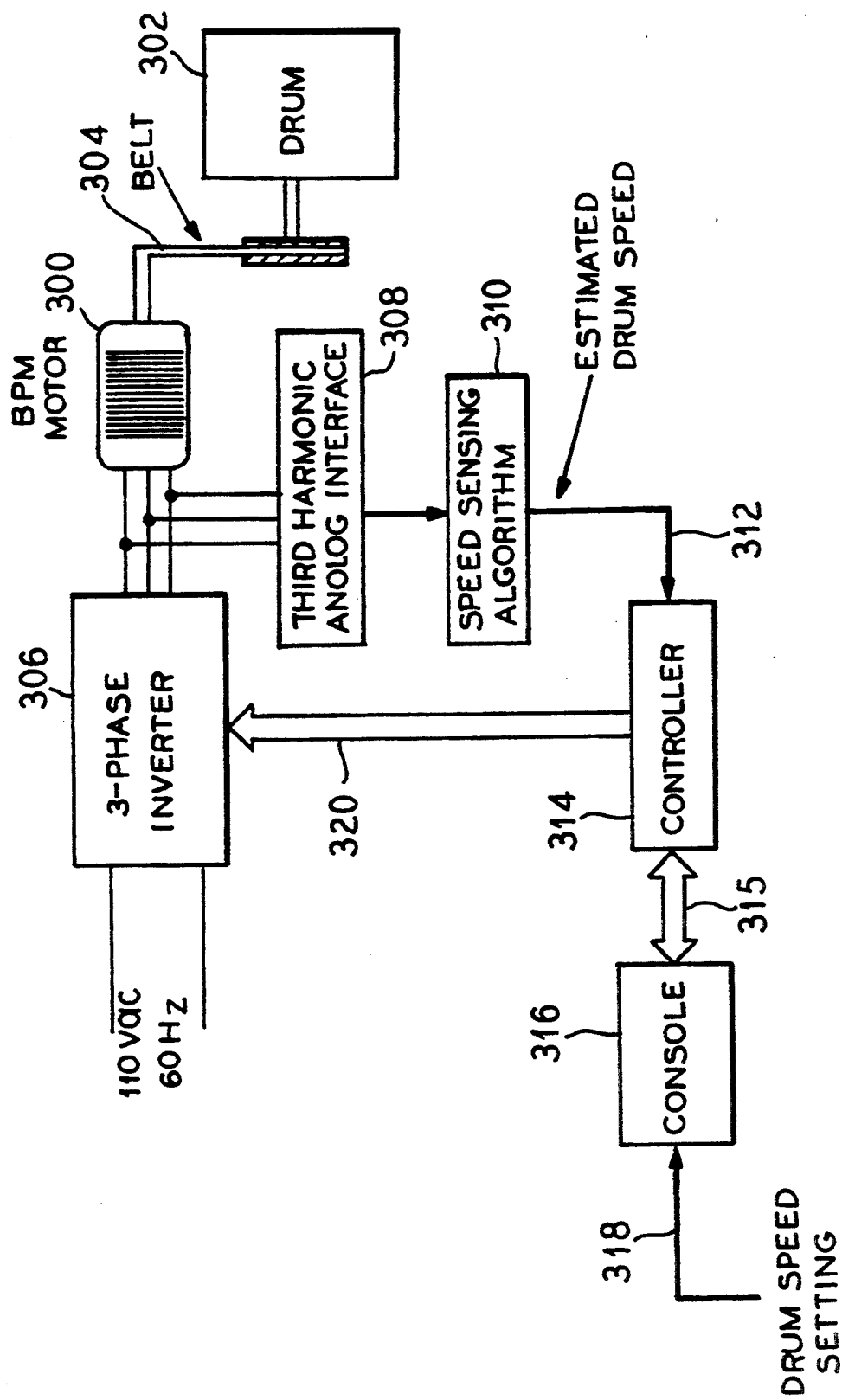
FIG. 16 illustrates a second application of the inventions, wherein the third harmonic stator voltage is used to estimate motor and drum speeds in a belt driven washing machine.
Figure 17:
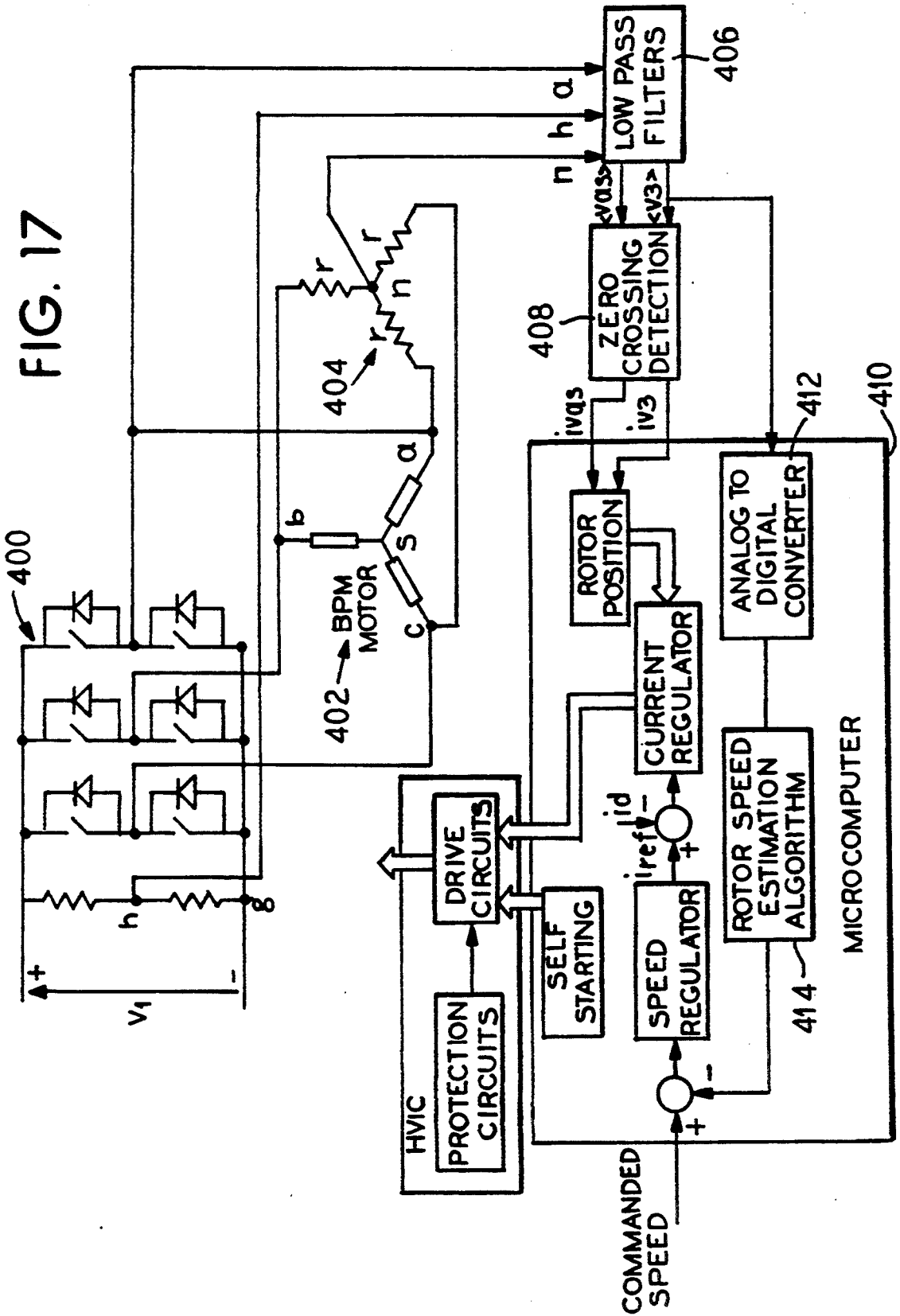
FIG. 17 illustrates a third application of the inventions, wherein the third harmonic stator voltage is used for speed control of a BPM motor in a laundry system.

FIGS. 15, 16 and 17 illustrate in block diagram form at least three applications of the foregoing inventions. FIG. 15 illustrates uses of one or more of the inventions in operating a BPM motor 200 as a compressor motor for a compressor 202 of a refrigerator 204.

As illustrated, a three-phase inverter 206 is controlled by a logic controller 208. The logic controller 208 receives signals from a speed controller 210 which sets forth the requested motor speed based on a sensed compressor speed signal 212 and temperature signals 214 and 216 received from a speed sensing algorithm 218 described above and thermostat 220 and user setting 216, respectively. The speed sensing algorithm 212 in turn receives the various filtered and third harmonic component signals $v_3$ from an analog interface 218 appropriately coupled to the stator phases of the BPM motor 200 as described above.

FIG. 16 illustrates a somewhat similar arrangement for controlling operation of a BPM motor 300 for a belt-driven drum 302 of a clothes drier. The motor 300 is mechanically coupled to the drum 302 by a belt 304 in a suitable manner.

As illustrated, a three-phase inverter 306 is used to apply stator currents to the motor 300. An analog interface 308 obtains the third harmonic signal $v_3$ by one of the above described methods. A speed memory algorithm 310 derives an estimated drum/motor speed signal 312 based on the algorithm of FIGS. 14A and 14B. The estimated drum/motor speed signal 312 is received by a controller 314 which also receives control signals 315 from a console 316. The console 316 in turn receives a drum speed setting input 318 from a user.

As is also illustrated, the controller 314 generates the above described gating signals 320 that drive the inverter bridge of the inverter 306.

FIG. 17 illustrates a control scheme for a speed control of a BPM motor in a laundry system that is similar to the control scheme of FIG. 7. As illustrated, an inverter 400 is coupled to drive a BPM motor 402 and a star network of summing resistors 404 is coupled to the phase nodes of the inverter 400 to provide an artificial neutral node n as described above. The third harmonic component containing signal is obtained from across the midpoint reference node h of the DC bus and the artificial neutral node n of the star network of summing resistors 404. Additionally, the voltage of phase a is obtained.

The foregoing signals are low pass filtered in a filter section 406 to produce a filtered back EMF signal $v_{as}$ and $v_3$ are subjected to zero crossings detection in a zero crossing detector section 408 to produce zero crossing signals/vas and $iv_3$, respectively. The signals ivas, $iv_3$ and $v_3$ are transmitted as inputs to a microcomputer 410 in a manner similar to that described above in connection with FIG. 8. However, in the embodiment of FIG. 17, the signal $v_3$, not the signal $iv_3$, is directed into an analog to digital converter 412, and the resulting digital signal is directed to a rotor/motor speed algorithm 414 such as that set forth above in connection with FIGS. 14A and 14B.

Although modifications and changes may be suggested by those skilled in the art, it is intended that the patent warranted hereon embodies all changes and modifications as reasonably and properly come within the scope of the contribution of the inventions to the art.

I claim:

1. A method for determining rotor speed information of a brushless permanent magnet motor, said motor having stator phase windings relative to which the rotor rotates and in which are induced a back EMF force having a fundamental component and a third harmonic component, said motor being driven by an inverter bridge operatively coupled thereto, comprising the steps of:

generating a first signal including the third harmonic component;

filtering the first signal and generating from the first signal a second signal containing substantially only the third harmonic component;

integrating the second signal and generating a third signal that comprises the integral of the second signal;

measuring the amplitude of the second signal at instances defined by zero crossings of the third signal; and generating a speed measurement signal that comprises a value proportional to the absolute value of the last measurement of the amplitude of the second signal.

2. The method of claim 1, wherein the step of filtering the first signal comprises low pass filtering the first signal to remove signal components with frequencies above that of the third harmonic component.

3. The method of claim 2, wherein the step of filtering the first signal also comprises high pass filtering the first signal to remove signal components with frequencies below that of the third harmonic component.

4. The method of claim 1, wherein the step of filtering the first signal comprises high pass filtering the first signal to remove signal components with frequencies above that of the third harmonic component.

5. The method of claim 1 further comprising the step of generating an interrupt in a microcomputer upon occurrence of a zero crossing of the third signal.

6. The method of claim 1, wherein the speed measurement signal comprises a direct current signal whose amplitude is proportional to the absolute value of the last measurement of the amplitude of the second signal.

7. The method of claim 1, wherein the step of generating the first signal includes extracting the first signal from across the ground node of the inverter and a common neutral node of the stator windings.

8. The method of claim 1, wherein the step of generating the first signal comprises extracting a signal from across a node provided midway between positive and negative rails of the inverter and an artificial neutral node provided separate and apart from, but in correspondence with, a common neutral node of the stator phase windings.

9. The method of claim 1, wherein the step of generating the first signal comprises extracting a signal from across a negative rail of the inverter and an artificial neutral node provided separate and apart from, but in correspondence with, a common neutral node of the stator windings.

10. A system for determining rotor speed information of a brushless permanent magnet motor, said motor having stator phase windings relative to which the rotor rotates and in which are induced a back EMF force having a fundamental component and a third harmonic component, said motor being driven by an inverter bridge operatively coupled thereto, comprising:
    means for acquiring a first signal including the third harmonic component;
    a filter operatively coupled to the means for generating the first signal, which filter generates a second signal containing substantially only the third harmonic component;
    an integrator unit coupled to the filter and configured to generate a third signal signal that comprises the integral of the second signal;
    a zero crossings detector coupled to the integrator unit to detect zero crossings of the third signal and to generate a fourth signal with information concerning zero crossings of the third signal;
    a unit coupled to both the integrator unit and the filter that measures the amplitude of the second signal at instances defined by zero crossings of the third signal; and
    a unit that generates a speed measurement signal that has a value proportional to the absolute value of the last measured amplitude of the second signal.

11. The system of claim 10, wherein the filter comprises a low pass filter which removes signal components with frequencies above that of the third harmonic component.

12. The system of claim 11, wherein the filter comprises a high pass filter which removes signal components with frequencies below that of the third harmonic component.

13. The method of claim 11, wherein the filter comprises a high pass filter which removes signal components with frequencies above that of the third harmonic component.

14. The system of claim 10 further comprising a microcomputer having an interrupt port to which the fourth signal is coupled.

15. The system of claim 10, wherein the speed measurement signal comprises a direct current signal whose amplitude at a given instant is proportional to the absolute value of the last measured amplitude of the second signal.

16. The system of claim 10, wherein the means for generating the first signal includes electrical connections for extracting the first signal from across the ground node of the inverter and a common neutral node of the stator windings.

17. The system of claim 10, wherein the means for generating the first signal comprises an electrical node between positive and negative power nodes of the inverter, a star network of resistors coupled to nodes of the inverter and providing an artificial neutral node separate and apart from, but in correspondence with, a common neutral node of the stator phase windings and electrical connections for extracting a signal from across the node provided between the positive and negative power nodes of the inverter and the artificial neutral node.

18. The system of claim 10, wherein the means for generating the first signal comprises a star network of resistors coupled to nodes of the inverter and providing an artificial neutral node separate and apart from, but in correspondence with, a common neutral node of the stator windings, and electrical connections for extracting a signal from across a negative power node of the inverter and the artificial neutral node.

19. A method for determining rotor speed information of a brushless permanent magnet motor, said motor having stator phase windings relative to which the rotor rotates and in which are induced a back EMF force having a fundamental component and a third harmonic component, said motor being driven by an inverter bridge operatively coupled thereto, comprising the steps of:
    generating a first signal including the third harmonic component;
    low and high pass filtering the first signal and generating from the first signal a second signal containing substantially only the third harmonic component;
    integrating the second signal and generating a third signal that comprises the integral of the second signal;
    measuring the amplitude of the second signal at instances defined by zero crossings of the third signal; and
    generating a direct current speed measurement signal whose amplitude at any given instant is proportional to the absolute value of the last measurement of the amplitude of the second signal.

20. The method of claim 19, wherein the step of generating the first signal includes extracting the first signal from across the ground node of the inverter and a common neutral node of the stator windings.

21. The method of claim 19, wherein the step of acquiring the first signal comprises extracting a signal from across a node provided midway between positive and negative rails of the inverter and an artificial neutral node provided separate and apart from, but in correspondence with, a common neutral node of the stator phase windings.

22. The method of claim 19, wherein the step of generating the first signal comprises extracting a signal from across a negative rail of the inverter and an artificial neutral node provided separate and apart from, but in correspondence with, a common neutral node of the stator windings.

23. A system for determining rotor speed information of a brushless permanent magnet motor, said motor having stator phase windings relative to which the rotor rotates and in which are induced a back EMF force having a fundamental component and a third harmonic component, said motor being driven by an inverter bridge operatively coupled thereto, comprising:
    means for acquiring a first signal including the third harmonic component;
    a filter operatively coupled to the means for generating the first signal, which filter generates a second signal containing substantially only the third harmonic component;
    an integrator unit coupled to the filter and configured to generate a third signal signal that comprises the integral of the second signal;

a zero crossings detector coupled to the integrator unit to detect zero crossings of the third signal and to generate a fourth signal with information concerning zero crossings of the third signal;

a unit coupled to both the integrator unit and the filter that measures the amplitude of the second signal at instances defined by zero crossings of the third signal; and a unit that generates a speed measurement signal that has a value proportional to the absolute value of the last measured amplitude of the second signal.

24. The system of claim 23, wherein the means for acquiring the first signal includes electrical connections for extracting the first signal from across the ground node of the inverter and a common neutral node of the stator windings.

25. The system of claim 23, wherein the means for acquiring the first signal comprises an electrical node between positive and negative power nodes of the inverter, a star network of resistors coupled to nodes of the inverter and providing an artificial neutral node separate and apart from, but in correspondence with, a common neutral node of the stator phase windings and electrical connections for extracting a signal from across the node provided between the positive and negative power nodes of the inverter and the artificial neutral node.

26. The system of claim 23, wherein the means for acquiring the first signal comprises a star network of resistors coupled to nodes of the inverter and providing an artificial neutral node separate and apart from, but in correspondence with, a common neutral node of the stator windings, and electrical connections for extracting a signal from across a negative power node of the inverter and the artificial neutral node.

* * * * *